US011216998B2

(12) United States Patent
Tagra et al.

(10) Patent No.: US 11,216,998 B2
(45) Date of Patent: *Jan. 4, 2022

(54) JOINTLY EDITING RELATED OBJECTS IN A DIGITAL IMAGE

(71) Applicant: Adobe Inc., San Jose, CA (US)

(72) Inventors: Sanjeev Tagra, Panipat (IN); Sachin Soni, New Delhi (IN); Prasenjit Mondal, District-West Midnapore (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,714

(22) Filed: Dec. 17, 2020

(65) Prior Publication Data

US 2021/0104085 A1 Apr. 8, 2021

Related U.S. Application Data

(62) Division of application No. 16/202,979, filed on Nov. 28, 2018, now Pat. No. 10,902,657.

(51) Int. Cl.
*G06T 11/60* (2006.01)
*G06T 17/20* (2006.01)
*G06T 7/90* (2017.01)
*G06T 7/10* (2017.01)

(52) U.S. Cl.
CPC ............... *G06T 11/60* (2013.01); *G06T 7/10* (2017.01); *G06T 7/90* (2017.01); *G06T 17/20* (2013.01); *G06T 2210/12* (2013.01)

(58) Field of Classification Search
CPC .................................. G06T 11/60; G06T 7/10
See application file for complete search history.

(56) References Cited

U.S. PATENT DOCUMENTS

| 9,195,965 B2* | 11/2015 | Sitrick | G06Q 10/101 |
| 10,902,657 B2* | 1/2021 | Tagra | G06T 7/90 |
| 2018/0300046 A1* | 10/2018 | Goyal | G06F 3/04847 |
| 2020/0167981 A1 | 5/2020 | Tagra et al. | |

OTHER PUBLICATIONS

"Corrected Notice of Allowance", U.S. Appl. No. 16/202,979, filed Sep. 23, 2020, 5 pages.
"Notice of Allowance", U.S. Appl. No. 16/202,979, filed Sep. 15, 2020, 7 pages.
"Pre-Interview First Office Action", U.S. Appl. No. 16/202,979, filed Jun. 9, 2020, 3 pages.

* cited by examiner

*Primary Examiner* — Tuan H Nguyen
(74) *Attorney, Agent, or Firm* — FIG. 1 Patents

(57) ABSTRACT

In implementations of jointly editing related objects in a digital image, an image editing application segments a first object in a digital image, and an additional object corresponding to the first object, such a shadow cast by the first object, a reflection of the first object, or an object of a same object class as the first object. Respective stick diagrams for the first object and the additional object are generated, and a mapping of the first object to the additional object is generated based on the stick diagrams. Based on a user request to edit the first object, such as to warp the first object, the first object and the additional object are jointly edited based on the mapping. Accordingly, realistic digital images are efficiently generated that maintain correspondence between related objects, without requiring a user to edit each object individually, thus saving time and resources.

20 Claims, 14 Drawing Sheets

JOINTLY EDITING RELATED OBJECTS IN A DIGITAL IMAGE

RELATED APPLICATION

This application is a divisional of and claims priority to U.S. patent application Ser. No. 16/202,979 filed Nov. 28, 2018 entitled "Jointly Editing Related Objects in a Digital Image", the disclosure of which is incorporated by reference herein in its entirety.

BACKGROUND

Digital images can be edited with an image editing application to adjust content of the digital images, including a variety of edits, such as adjusting color, lighting, position, and content adjustments of objects in a digital image. A commonly applied edit to a digital image includes deforming an object appearing in the digital image. For instance, an object in a digital image may be deformed (e.g., warped or distorted) to create an animation sequence. To warp or change an object in a digital image, a user may select and drag a handle on the object appearing in the digital image, such as a user-specified object edit point. However, when an object is edited in a digital image, conventional image editing techniques do not take into account a related object, or objects, that would also need to be updated or edited to maintain a realistic appearance of the image. For example, shadows, reflections, and general object relations to other objects are not typically taken into account when an object is edited in a digital image by conventional image editing applications. Consequently, users of conventional image editing applications must expend extra time and effort to separately edit an additional, related object, such as a shadow, that appears in the image and corresponds to an edited object, such as a person who casts the shadow, rendering conventional image editing applications inefficient.

SUMMARY

Techniques and systems are described to jointly edit related objects in a digital image, such as to warp or change an additional object that corresponds to a first object together with the first object, based on a single user-request to warp the first object. An image editing application segments a first object in a digital image and an additional object corresponding to the first object, such as a shadow cast by the first object, a reflection of the first object, an object of a same object class as the first object, and the like. The image editing application generates respective stick diagrams for the first object and the additional object that have been segmented, such as with a skeletization process that successively thins branches of a tree and approximates multiple branches with a line segment to form a stick diagram. Based on the stick diagrams for the objects, the image editing application generates a mapping of the first object to the additional object. When the image editing application receives a user request to edit the first object, such as to warp the first object, the image editing application jointly edits the first object and the additional object based on the mapping. Accordingly, the image editing application efficiently generates digital images that maintain realistic correspondence between objects, without requiring a user to edit each object individually.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Editing digital images often requires that an additional object corresponding to a first object be edited based on edits applied to the first object, so that the edited digital image appears realistic. For instance, when an object casts a shadow or reflection in a digital image, edits applied to the object may also need to be applied to the shadow or reflection, or the digital image will appear contrived and unrealistic. Conventional image editing applications, however, do not jointly edit an additional object (e.g., a shadow or reflection) that corresponds to, or is related to, a first object, but rather require a user apply similar edits to the first object and the additional, related object separately. For edits that require multiple user inputs, such as designating multiple anchor points for an object when deforming the object, conventional image editing applications require tedious user inputs that can consume significant time and effort. Hence, conventional image editing applications are inefficient, especially when used to warp or deform objects in digital images.

Figure 1:
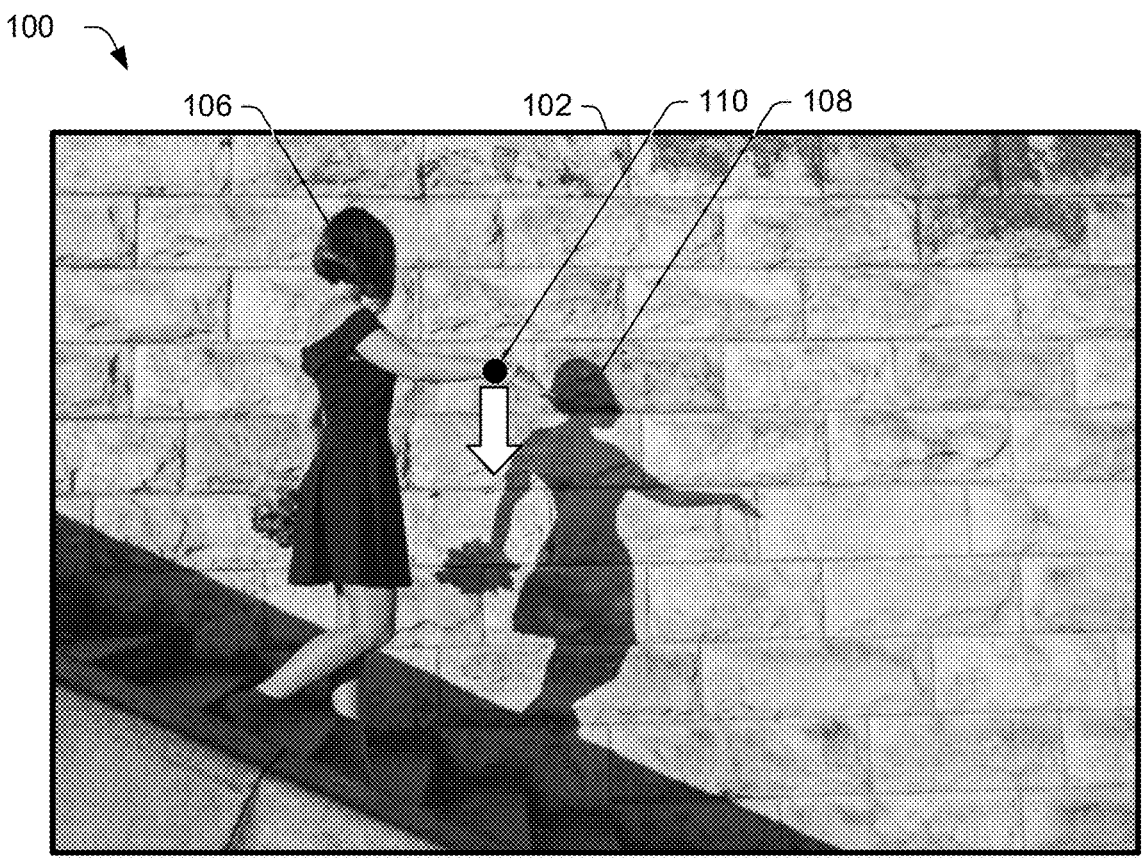
FIG. 1 illustrates example images in accordance with one or more aspects of the disclosure.
Figure 1:

For example, FIG. 1 illustrates a digital image that includes a person (e.g., an object that will be edited) and her shadow (e.g., a related object corresponding to the edited object). The described techniques for jointly editing related objects in digital images accounts for a user editing an object in a digital image, and applying the same or similar edits to the related, corresponding object. As the user edits a person appearing in the digital image, the edited person's shadow will similarly be edited to maintain the realistic appearance of the image, rather than simply editing the person without changing the shadow. For example, in FIG. 1, the images 100 includes image 102 and image 104. Image 102 includes a woman 106 and a shadow 108 corresponding to woman 106. Woman 106 and shadow 108 represent objects in image 102, and an object edit point 110 is located on woman 106. For instance, a user may place object edit point 110 on woman 106, such as with a cursor of a computing device, so that the depiction of the woman 106 can be edited or changed. In FIG. 1, object edit point 110 is dragged downward to edit the depiction of the woman 106, as indicated by the arrow overlaid on image 102.

Image 104 is generated responsive to the depiction of the woman 106 being edited (also commonly referred to as "warping" or "deforming" an object shown in an image). For instance, the woman's arm is dragged downward at object edit point 110 to edit the location of the woman's arm in the image and form the depiction of woman 112 in image 104 with her arm having been lowered. If the woman 106 and shadow 108 are not edited together, image 104 appears unrealistic, since shadow 108 no longer corresponds to the depiction of woman 112. In FIG. 1, the shadow is used as an example of a related object that corresponds to a first object (e.g., the woman) in which the objects require similar edits applied to them so that the edited image looks realistic. For instance, when the first object is edited, the related object also needs to be edited for similar appearance so that the related object continues to realistically correspond to the appearance of the first object.

Accordingly, this disclosure describes systems, devices, and techniques for jointly editing related objects in a digital image. An image editing application segments a first object in a digital image, and segments an additional object corresponding to the first object, such as a shadow cast by the first object, a reflection of the first object, an object of a same object class as the first object (e.g., a row of cars, multiple persons, multiple soup cans, etc.), and the like. Segmentation refers to separating and isolating an object in a foreground of an image from the background of the image.

The image editing application may segment the first object and the additional object in a same digital image or in multiple digital images. For instance, the image editing application may segment an animal and a reflection of the animal in a digital image. The animal represents a first object, and the reflection of the animal represents an additional object corresponding to, or related to, the first object. Additionally or alternatively, the image editing application may segment an animal in one image frame of a video sequence and segment the animal in a different image frame of the video sequence. Hence, the animal in the one image frame may represent a first object, and the animal in the different image frame may represent an additional object that corresponds to the first object.

The image editing application generates a mapping of points on a first object to respective points on an additional object, so that when the image editing application receives a request to edit the first object (e.g., to warp, change, or deform the first object), the image editing application can jointly edit the first object and the additional object based on the mapping of the respective, related object points. To generate the mapping, the image editing application generates respective stick diagrams for the first object and the additional object, such as with a skeletonization process. A skeletonization process generates a skeleton (or tree) of an object and successively thins branches of the tree, such as by approximating multiple branches of the tree with a line segment, to form a stick diagram. Hence, each stick diagram includes line segments between nodes of the stick diagram. Nodes may include internal points (e.g., nodes connected to multiple line segments) and end-points (nodes connected to only one line segment). Each end-point of the stick diagram is connected to an additional end-point of the stick diagram by a skeleton path. Hence, a skeleton path may include one or more of the line segments of a stick diagram.

In one example, the image editing application determines that stick diagrams corresponding to an edited object and a related object match one another to enable the objects represented by the stick diagrams to be jointly edited. Hence, a user may not be required to explicitly link an additional or related object with a first object corresponding to the additional object to enable the two objects to be jointly edited. Instead, the image editing application can be implemented to automatically and without user intervention associate an additional object with a first object so that the objects may be jointly edited when the image editing application receives an input to edit the first object. Additionally or alternatively, the image editing application exposes a user interface that includes an option to select or confirm objects that are to be associated with one another, and jointly edited together.

The image editing application may determine that stick diagrams match one another in any suitable way. In one example, the image editing application determines first coordinates of the nodes of the stick diagram for a first object, and second coordinates of the nodes of the stick diagram for an additional object. The coordinates can be determined in respective normalized coordinate systems for the stick diagrams, to facilitate scale-invariant comparisons. In one example, a normalized coordinate system for a stick diagram includes coordinates that are normalized (e.g., within a range, such as [0, 1]) by a bounding box that includes the stick diagram. The image editing application determines differences between the first coordinates and the second coordinates, and requires that a number of the differences less than a proximity threshold (e.g., a Euclidean distance of 0.1) is greater than a threshold number of nodes (e.g., three of the nodes, a percentage of the total number of nodes, such as at least 70%, etc.) to declare that the stick diagrams of the first object and the additional object match one another.

Additionally or alternatively, the image editing application may require that a number of lengths of line segments of stick diagrams, computed in normalized coordinate systems, match one another to declare that the stick diagrams match. For instance, the image editing application may require a threshold number of the line segments of respective stick diagrams have lengths matching (e.g., a difference of the normalized lengths is less than a length difference threshold (e.g., 0.1, 10% of a maximum length on a line segment, etc.). Additionally or alternatively, the image editing application may require that a number of angles between line segments of stick diagrams match one another to declare that the stick diagrams match, such as at least four of the angles, or a percentage of the angles (e.g., 50%).

For stick diagrams of objects determined to match one another, the image editing application generates a mapping between the objects represented by the stick diagrams. The image editing application generates a mapping between a first object and an additional object by determining pairs of skeleton paths, each pair including a skeleton path of the stick diagram for the first object and a skeleton path of the stick diagram for the additional object that matches the skeleton path of the stick diagram for the first object. The image editing application can determine that skeleton paths match one another by various techniques, including comparing lengths of the skeleton paths computed in normalized coordinate systems, coordinates of the end-points of skeleton paths also computed in normalized coordinate systems, chain codes generated for the skeleton paths, and combinations thereof.

A chain code for a skeleton path includes a sequence of symbols, with each symbol indicating a direction of the skeleton path at a sample of the skeleton path, such as one of eight directions at each sample of the skeleton path. The image editing application may compare chain codes for skeleton paths and compute a matching score based on the chain codes, such as a number of symbols of a first chain code that equal symbols of a second chain code, divided by the number of symbols of one of the chain codes (e.g., the longer of the two chain codes). In one example, the image editing application requires that the matching score for two chain codes be greater than a chain code threshold to determine that the skeleton paths of the two chain codes match.

By determining skeleton paths of a stick diagram of a first object that match skeleton paths of a stick diagram of an additional object, the mapping generated by the image editing application maps the first object to the additional object. For instance, points on a stick diagram of a first object are mapped to points on a stick diagram of the additional object based on endpoints and lengths of matching skeleton paths for the two objects. Hence, the image editing application uses the mapping between the two objects to jointly apply edits to the two objects when an edit is received for one of the objects.

For editing inputs, such as to edit or change an object in a digital image, a user may typically select multiple anchor points of an object to indicate locations of the object that are to remain fixed when the object is edited, and also select an object edit point from which the object is to be edited. The image editing application projects the user-supplied anchor points for a first object to the stick diagram of the first object to generate a set of projected points on the stick diagram. Using the mapping, including skeleton paths for the first object that match skeleton paths for the additional object, the image editing application determines a set of additional points on the stick diagram of the additional object that are anchor points corresponding to the projected points on the stick diagram of the first object. Furthermore, using the mapping, the image editing application determines a location of a virtual object edit point for the additional object that corresponds to the user-provided object edit point for the first object.

Using the projected points (e.g., the anchor points that have been projected onto a stick diagram of a first image) and the user-supplied object edit point, the image editing application determines a first set of triangles of a triangle mesh of the first object, such as triangles between the user-supplied object edit point and a nearest projected point. For the additional object, the image editing application determines a second set of triangles of a triangle mesh of the additional object, such as triangles between the virtual object edit point and a nearest point on the stick diagram of the additional object determined from the anchor points and the mapping.

When the image editing application receives a user input indicative of a request to edit (e.g., warp, change, or deform) the first object at the object edit point (e.g., as a grab and drag motion), the image editing application jointly warps the first object and the additional object by applying a same or similar set of transformations (e.g., translation, rotation, or both translation and rotation) corresponding to the user input to the first set of triangles and the second set of triangles. For instance, the transformations may change vertice locations for the first set of triangles and the second set of triangles. Hence, the image editing application efficiently edits an object and related objects that correspond to the edited object, such as a shadow, a reflection, a similar object (e.g., an object of a same object class as the object), and the like, without requiring the user to independently edit the object and the related objects that correspond to the object, saving time and resources.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
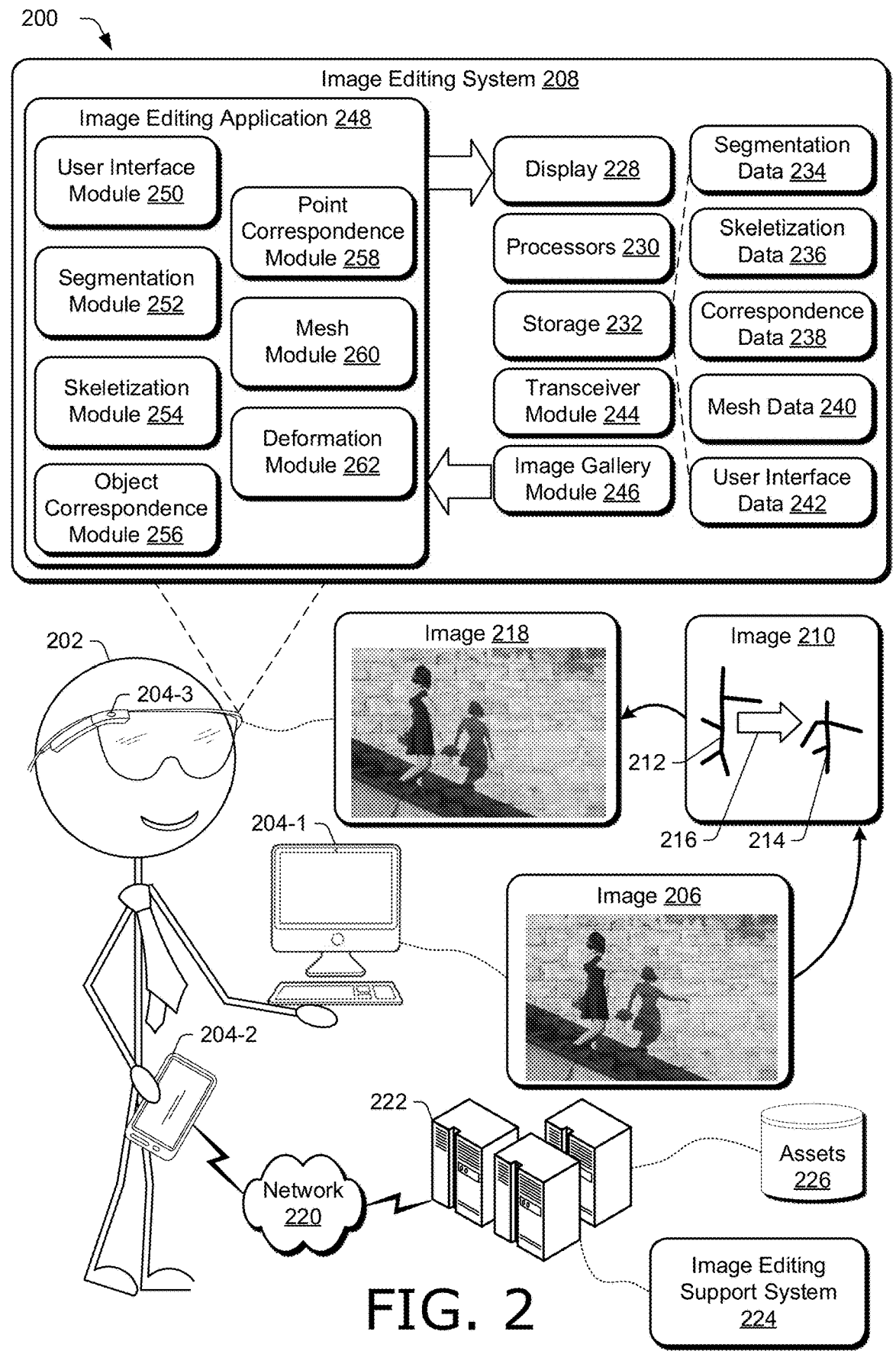
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes a user 202 having at least one computing device. In the example in FIG. 2, user 202 is illustrated as having three computing devices 204 (collectively 204-1 through 204-3). For instance, computing device 204-1 depicts a desktop computer, computing device 204-2 depicts a smart phone, and computing device 204-3 depicts a pair of eye glasses (e.g., smart goggles). Computing devices 204 are example computing devices, and any suitable computing device is contemplated, such as a mobile phone, tablet, laptop computer, desktop computer, gaming device, goggles, glasses, camera, digital assistant, echo device, image editor, non-linear editor, digital audio workstation, copier, scanner, and the like. Furthermore, discussion of one of computing devices 204 is not limited to that computing device, but generally applies to each of the computing devices 204-1 through 204-3. Moreover, computing devices 204 may range from full resource devices with substantial memory and processor resources (e.g., personal computers, game consoles) to a low-resource device with limited memory or processing resources (e.g., mobile devices).

In one example, computing devices 204 include a wearable device that is designed to be worn by, attached to, carried by, or otherwise transported by user 202. Examples of wearable devices include glasses, a smart band or watch, and a pod device such as clip-on fitness device, media player, or tracker. Other examples of a wearable device include but are not limited to a badge, a key fob, an access card, and a ring, an article of clothing, a glove, and a bracelet.

Various types of input devices and input instrumentalities can be used to provide input to computing devices 204. For example, computing devices 204 can recognize input as being a mouse input, stylus input, touch input, input provided through a natural user interface, and the like. Thus, computing devices 204 can recognize multiple types of gestures including touch gestures and gestures provided through a natural user interface. In one example, computing devices 204 include speech recognition, identification, and synthesis functionalities, microphones, and speakers that allow computing devices 204 to communicate with user 202 in a conversation, e.g., a user conversation.

Figure 14:
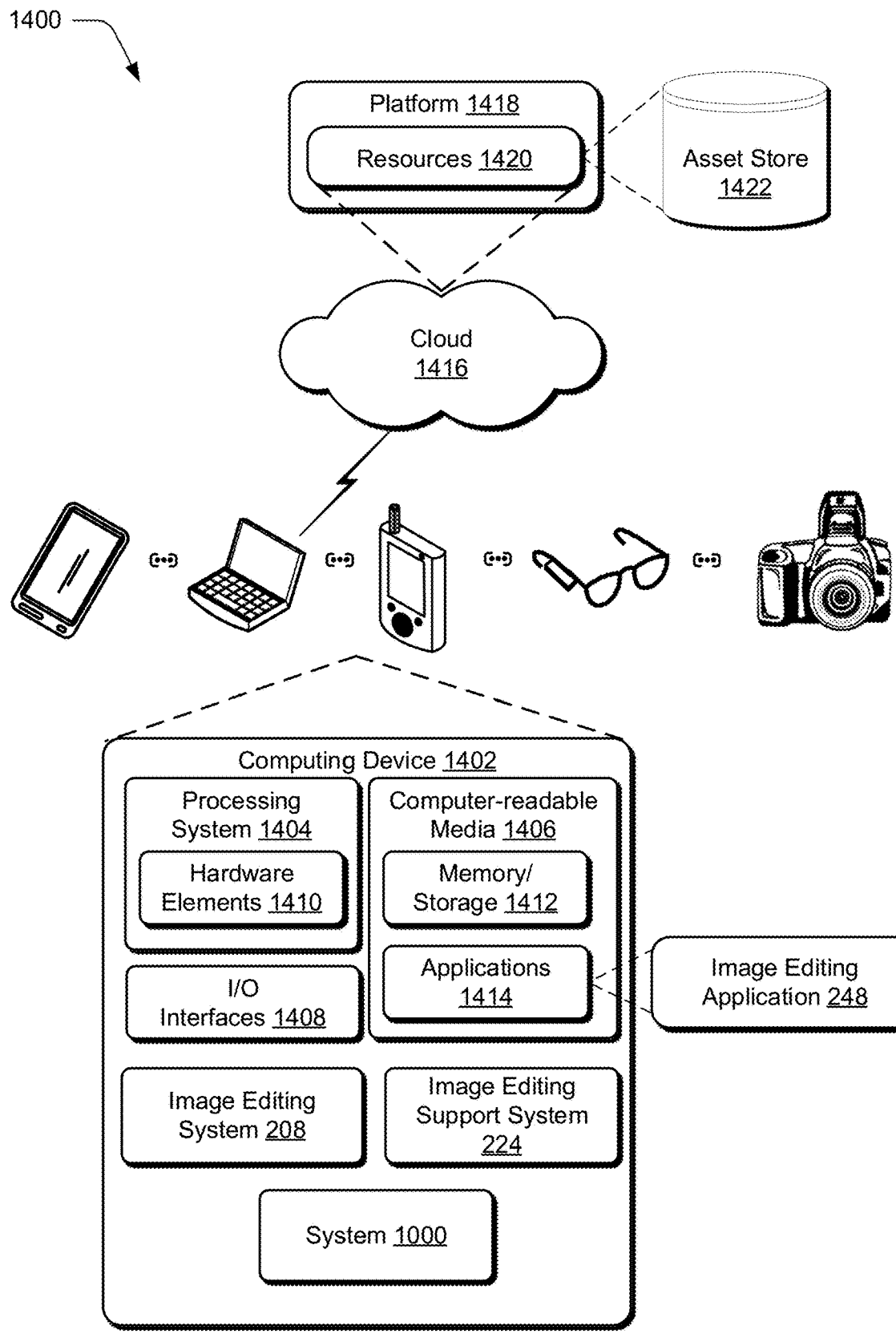
FIG. 14 illustrates an example system including various components of an example device that can be implemented as any type of computing device as described and/or utilized with reference to FIGS. 1-13 to implement aspects of the techniques described herein.

Furthermore, computing devices 204 may be representative of one or a plurality of different devices, such as one or more devices connected to a network that perform operations "over the cloud" as further described in relation to FIG. 14. In one example, computing devices 204 are communicatively coupled to each other, such as with a low power wireless communication standard (e.g., a Bluetooth® protocol). For instance, computing device 204-1 can communicate wirelessly with computing device 204-2 and computing device 204-3. Hence, an asset (e.g., image, video, text, drawing, document, file, and the like) generated, processed, edited, or stored on one device (e.g., computing device 204-1) can be communicated to, and displayed and processed on another device (e.g., computing device 204-3).

In the example illustrated in FIG. 2, computing device 204-1 obtains image 206. Image 206 is an example of a digital image to be edited, and can be obtained in any suitable way, such as from another computing device, from file storage on computing device 204-1, supplied by user 202 and received on computing device 204-1, and the like. In one example, image 206 includes a rasterized image. Additionally or alternatively, image 206 can be represented by curves, such as n-th order polynomial splines, (e.g., n=1, 2, 3, or 4), Bezier segments, combinations thereof, and the like. In one example, image 206 is represented by a mesh of primitives (e.g., a triangle mesh of an object of an image).

In image 206, an object is represented by a woman appearing in the image, and an additional object corresponding to, or related to, the object is represented by a shadow cast by the woman. In the following, this example with the woman and the shadow cast by the woman is continued in discussion with reference to FIGS. 2-7.

In FIG. 2, using image editing system 208 (discussed below in more detail), computing device 204-1 generates image 210 from image 206. Image 210 is an example of a skeleton image and includes two stick diagrams, stick diagram 212 and stick diagram 214. Stick diagram 212 corresponds to the woman in image 206, and stick diagram 214 corresponds to the shadow in image 206. Image editing system 208 may determine that the shadow corresponds to the woman in image 206 by matching stick diagram 212 with stick diagram 214, and therefore determine that when the woman is warped according to an edit request, the shadow should also be warped according to the edit request. Hence, image editing system 208 generates a mapping between stick diagram 212 and stick diagram 214. In FIG. 1, this mapping is illustrated by arrow 216. In one example, image editing system 208 generates the mapping illustrated by arrow 216 by matching skeleton paths of stick diagram 212 to skeleton paths of stick diagram 214. A skeleton path of a stick diagram includes one or more line segments of the stick diagram connecting two end-points of the stick diagram.

Accordingly, image editing system 208 generates image 218, exposed in a user interface of computing device 204-3, responsive to receiving a user input indicative of a request to warp the woman in image 206, e.g., to lower the woman's arm. In image 218, the woman's arm has been lowered and the shadow's arm has been lowered together, based on the mapping indicated by arrow 216. Unlike image 104-1 in FIG. 1, image 218 in FIG. 2 does not require additional user input to warp the shadow, since the shadow has been warped by image editing system 208 jointly with the woman, based on a user request to warp the woman in image 206. Accordingly, image editing system 208 jointly edits related objects in digital images, saving time and resources.

Computing devices 204 are also coupled to network 220. Network 220 communicatively couples computing devices 204 with server 222. For clarity, only computing device 204-2 is illustrated in FIG. 2 as coupled to network 220, though computing devices 204-1 and 204-3 can also be coupled to server 222 via network 220. Network 220 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 222 may include one or more servers or service providers that provide services and/or resources to computing devices 204. Generally, resources provided by server 222 may be licensed, purchased, or may be made freely available, (e.g., without authentication, license, or account-based access). The resources can include any suitable combination of services and content, such as made available over network 220 by one or more providers. Some examples of services include, but are not limited to, an on-line shopping service, an image editing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, and the like. Assets may be made available to image editing system 208, image editing support system 224, or combinations thereof, and stored at assets 226 of server 222. Hence, image 206 can include any suitable asset stored at assets 226 of server 222.

Furthermore, server 222 includes image editing support system 224 configurable to receive signals from computing devices 204, process the received signals, and send the processed signals to computing devices 204 to support jointly editing related objects in a digital image. For instance, computing device 204-1 may obtain any suitable representation of an image, such as a rasterized image, and communicate any suitable data (e.g., segmented objects of a digital image) to server 222. Server 222, using image editing support system 224, may generate stick diagrams and a mapping of the stick diagrams from the data received from computing device 204-1. Server 222 may then provide a mapping of the stick diagrams back to computing device 204-1, which can determine points on the stick diagrams corresponding to user-supplied locations. Based on the points determined with computing device 204-1, image editing system 208 may jointly warp related objects in a digital image based on a user input indicative of a request to warp one of the related objects. Accordingly, image editing support system 224 of server 222 can include a copy of image editing system 208.

Computing devices 204 include image editing system 208 to jointly edit related objects in a digital image. For clarity, computing device 204-3 is illustrated in FIG. 2 as including image editing system 208, though computing device 204-1 and computing device 204-2 also include copies of image editing system 208 (not shown).

Image editing system 208 includes a display 228. Display 228 can expose any suitable data used by or associated with image editing system 208. In one example, display 228 displays a user interface for exposing assets, such as digital images, segmentation images (e.g. images including one or more segmented objects), skeleton images (e.g., images including one or more stick diagrams, one or more trees, one or more matching skeleton paths, etc.), images including one or more triangle meshes, combinations thereof, and the like. Display 228 can expose a user interface configurable to edit an image, such as selecting handle locations (e.g., anchor points and object edit points) to deform a mesh of an object in an image.

Display 228 can include any suitable type of display, such as a touchscreen, liquid crystal display, plasma display, head-mounted display, projector and screen, and the like. A touchscreen of display 228 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Image editing system 208 also includes processors 230. Hence, image editing system 208 may be implemented at least partially by executing instructions stored on storage 232 on processors 230. For instance, processors 230 may execute portions of image editing application 248 (discussed below in more detail).

Storage 232 can be any suitable type of storage accessible by or contained in image editing system 208. Storage 232 stores and provides access to and from memory included in storage 232 for any suitable type of data. For instance, storage 232 includes segmentation data 234, such as segmentation images including one or more segmented objects, data of segmented objects (e.g., color pixel maps of objects), greyscale images of segmented objects, binarized images including binary values for pixels (e.g., black pixels designating segmented objects and white pixels designating regions without segmented objects), thresholds used to determine pixel values, unions of pixel values, indications of whether segmented objects are flipped (e.g., inverted with respect to an axis of an image, such as a horizontal axis), and the like.

Storage 232 also includes skeletization data 236, such as skeleton images, stick diagrams, trees, thinned branches of trees, skeleton paths, angles between line segments of stick diagrams, bounding boxes of stick diagrams, such as bounding boxes representing normalized coordinate systems of stick diagrams, coordinates of nodes of a stick diagram, including end-point locations and intermediate node locations, indicators of matching skeleton paths, e.g., pairs of skeleton paths including a skeleton path of a stick diagram of a first object and a skeleton path of a stick diagram of an additional object, the additional object corresponding to the first object, such as a shadow or reflection, lengths of skeleton paths (e.g., normalized lengths), chain codes of skeleton paths, and the like.

Storage 232 also includes correspondence data 238, such as a mapping of points of a first object to corresponding points of an additional object that corresponds to the first object, pairs of skeleton paths, such as a pair of matching skeleton paths that includes a skeleton path of a stick diagram of a first object and a skeleton path of a stick diagram of an additional object, lengths of skeleton paths (e.g., normalized lengths), chain codes of skeleton paths, coordinates of nodes of skeleton paths, including end-points and intermediate nodes, thresholds used to determine a mapping, user-defined anchor points, user-defined object edit points, projected points generated by projecting anchor points to a skeleton path, points on an additional skeleton path that correspond to the projected points, object edit points, virtual object edit points, and the like.

Storage 232 also includes mesh data 240, such as triangle meshes of objects, sets of triangles of a triangle mesh corresponding to a user request to warp an object, such as triangles between an object edit point and a projected point on a stick diagram, or triangles between a virtual object edit point and an additional point on an additional stick diagram determined from a projected point on a stick diagram, transformations applied to a mesh (e.g., translations and rotations), vertice locations of triangles of a mesh, locations on a triangle mesh (e.g., vertice locations that are closest to user-supplied anchor points and object edit points), a deformed mesh, and the like.

Storage 232 also includes user interface data 242, including data associated with user interfaces, such as user preferences (e.g., font size and style, locations and sizes of panels presented in a user interface, or preferred by users, and the like), data of users operating a user interface (e.g., user histories of edits including user-selections of thresholds, user interface configurations (e.g., different layouts, language options, etc.), controls and adjusters (e.g., sliders, lists of user gestures to control a user interface, etc.), options for point indicators, such as circles, rings, squares, triangles, colors, and the like used to indicate anchor points or object edit points, user interface version numbers, lists of operating systems supported by various user interfaces, thumbnail images of images to display in a user interface, toolbar icons, speech libraries for voice-actuated commands and gestures, images exposed in a user interface, such as input images (e.g., user-supplied images to be edited), segmentation images, skeleton images, correspondence images (e.g., images showing corresponding points on objects determined from a mapping generated by image editing system 208), images with edited objects, and the like.

Furthermore, image editing system 208 includes transceiver module 244. Transceiver module 244 is representative of functionality configured to transmit and receive data using any suitable type and number of communication protocols. For instance, data within image editing system 208 may be transmitted to server 222 with transceiver module 244. Furthermore, data can be received from server 222 with transceiver module 244. Transceiver module 244 can also transmit and receive data between computing devices 204. In one example, transceiver module 244 includes a low power wireless communication standard (e.g., a Bluetooth® protocol) for communicating data between computing devices 204.

Image editing system 208 also includes image gallery module 246. Image gallery module 246 is representative of functionality configured to obtain and manage images of image editing system 208, such as images that can be edited (e.g., by jointly warping related objects in an image), images in an animation sequence, thumbnail representations displayed in a user interface (e.g., thumbnail images of images in an animation sequence exposed in a user interface), images including a mesh, a rasterized image, images represented by vector graphics, and the like. Hence, image gallery module 246 may use transceiver module 244 to obtain any suitable data from any suitable source, including obtaining digital images from a user's directory of files on computing devices 204 or server 222, obtaining images from a user's photo gallery (e.g., an online photo sharing service, images stored in a user's image editing application, such as Photoshop®), obtaining images a user has posted in a social media post, blog, online comment, and the like, images a user has attached to an email, text, or other communication sent from or received by computing devices 204, images provided by a search service, such as an online search for digital images related to a search query, images obtained from a database of stock images, images provided by user 202 (e.g., receiving user-supplied images), images captured by a computing device, such as with a camera integrated into one of computing devices 204, and the like. Images obtained by image gallery module 246 are stored in storage 232 and made available to modules of image editing application 248.

Image editing system 208 also includes image editing application 248. Image editing application 248 includes user interface module 250, segmentation module 252, skeletization module 254, object correspondence module 256, point correspondence module 258, mesh module 260, and deformation module 262. These modules work in conjunction with each other to jointly edit related objects in a digital image, such as by warping a first object together with a shadow or reflection of the first object, so that the edited images looks realistic.

Furthermore, though the description of image editing system 208 and image editing application 248 describes jointly editing related objects in a digital image, image editing system 208 and image editing application 248 can be used to jointly edit related objects in any suitable asset, such as a document, web page, map, slide, presentation, image frames of a video or animation sequence, and the like.

Moreover, though the description of image editing system 208 and image editing application 248 describes jointly editing related objects in a digital image including warping the objects, image editing system 208 and image editing application 248 can be used to jointly edit related objects including any suitable edit, such as adjusting color of objects, cropping objects, filling objects, adjusting brightness, contrast, shading and the like of objects, applying a filter (e.g., a sepia tone filter) to objects, combinations thereof, and the like.

User interface module 250 is representative of functionality configured to generate, manage, and cause display of any suitable user interface, such as a user interface including a digital image. A user interface of user interface module 250 can expose any suitable data, such as an input image, a mesh of an object of an image, an animation sequence of images, a deformed image (e.g., an image formed by moving an object edit point on an image to deform an object in the image), stick diagrams, segmented objects, binarized objects that have been segmented, color pixel maps, greyscale images, indicators of a mapping of one stick diagram to another stick diagram, such as arrows between corresponding points of two objects, skeleton paths, bounding boxes indicating normalized coordinate systems, angles between line segments of stick diagrams, lengths of line segments and skeleton paths (e.g., lengths computed in a normalized coordinate system), combinations thereof, and the like.

A user interface of user interface module 250 can expose any suitable control options, such as options for selecting images, including lists of images and thumbnail representations of images, options for selecting any suitable threshold used by image editing system 208, options to set anchor point representations, options to select representations of object edit points, options to move a point (e.g., a button to enable an object edit point at a selected location to be relocated to another location without deforming artwork of the image), combinations thereof, and the like. In one example, a user adjusts a slider control exposed in a user interface of user interface module 250 to select a threshold level, such as a distance threshold used to compare lengths of skeleton paths when generating a mapping of points on one stick diagram to another stick diagram.

A user interface of user interface module 250 can receive any suitable user input. In one example, a user interface of user interface module 250 receives user-input indicating locations of anchor points for an object in an image. Anchor points may indicate locations of an object that are to remain static when an object is deformed. Additionally or alternatively, a user interface of user interface module 250 can receive a user-input indicating an object edit point for an object. An object edit point may indicate a position at which an object is to be distorted. A user interface may receive a user input indicative of a request to deform an object. For instance, a use may select and grab an object edit point with a mouse, and drag the object edit point to warp the object by deforming a triangle mesh of the object.

In one example, a user interface of user interface module 250 exposes thumbnail representations of images, such as images retrieved from by image gallery module 246. A user can select a thumbnail representation of an image and cause the selected image to be exposed in the user interface, so that a user may jointly edit related objects of the exposed image.

A user interface generated by user interface module 250, along with any suitable information, such as configurations settings of the user interface, user gestures (e.g., user inputs), thumbnail images, user preferences, images exposed in a user interface, combinations thereof, and the like, used by or calculated by user interface module 250 are stored in user interface data 242 of storage 232 and made available to modules of image editing application 248. In one example, a user interface generated by user interface module 250 is displayed by display 228, and user interface module 250 receives user inputs indicating anchor points, seed values, and a request to edit an object in a digital image. Additionally or alternatively, user interface module 250 can communicate indicators of anchor points and an indicator of an object edit point to point correspondence module 158, and a warp request to deformation module 262.

Segmentation module 252 is representative of functionality configured to segment objects in images, e.g., digital images. Segmentation module 252 can segment objects in any suitable way. In one example, segmentation module 252 generates one or more segmentation images indicating a segmentation of at least one object in an image. A segmentation of an object in an image may indicate regions of the image corresponding to an object and regions that do not correspond to the object in any suitable way, such as by including pixels that are extracted from the image, setting pixel values to colors to indicate an object (e.g., black or white), and the like. For instance, segmentation module 252 may generate a segmentation image that includes black pixels indicating an object in an image, and white pixels indicating regions of the image that do not correspond to the object.

In one example, segmentation module 252 segments multiple objects in a same digital image. Additionally or alternatively, segmentation module 252 can segment a first object in a first digital image and an additional object corresponding to the first object in an additional digital image. For instance, the first digital image and the additional digital image may be different image frames of a video sequence, and the first object and the additional object may represent a same object in the different image frames.

Segmentation module 252 may segment any suitable number of objects. In one example, segmentation module 252 segments a first object and an additional object corresponding to the first object, such as a shadow or reflection of the object, a similar object as the first object (e.g., belonging to a same object class or type), or combinations thereof. For instance, segmentation module 252 may generate a first segmentation image that includes a segmentation of a first object, and a second segmentation image that includes a segmentation of an additional object corresponding to the first object. Additionally or alternatively, segmentation module 252 may generate a segmentation image that includes multiple segmentations, such as a segmentation of a first object and a segmentation of an additional object corresponding to the first object.

Segmentation module 252 may segment an object appearing in an image in any suitable way. In one example, segmentation module 252 determines a boundary of an object (e.g., an outline of an object), and sets pixels inside the boundary to a first value (e.g., black), and pixels outside the boundary to a second value (e.g., white). An example of segmentation images generated by segmentation module 252 to segment objects in images is illustrated in FIG. 3.

Figure 3:
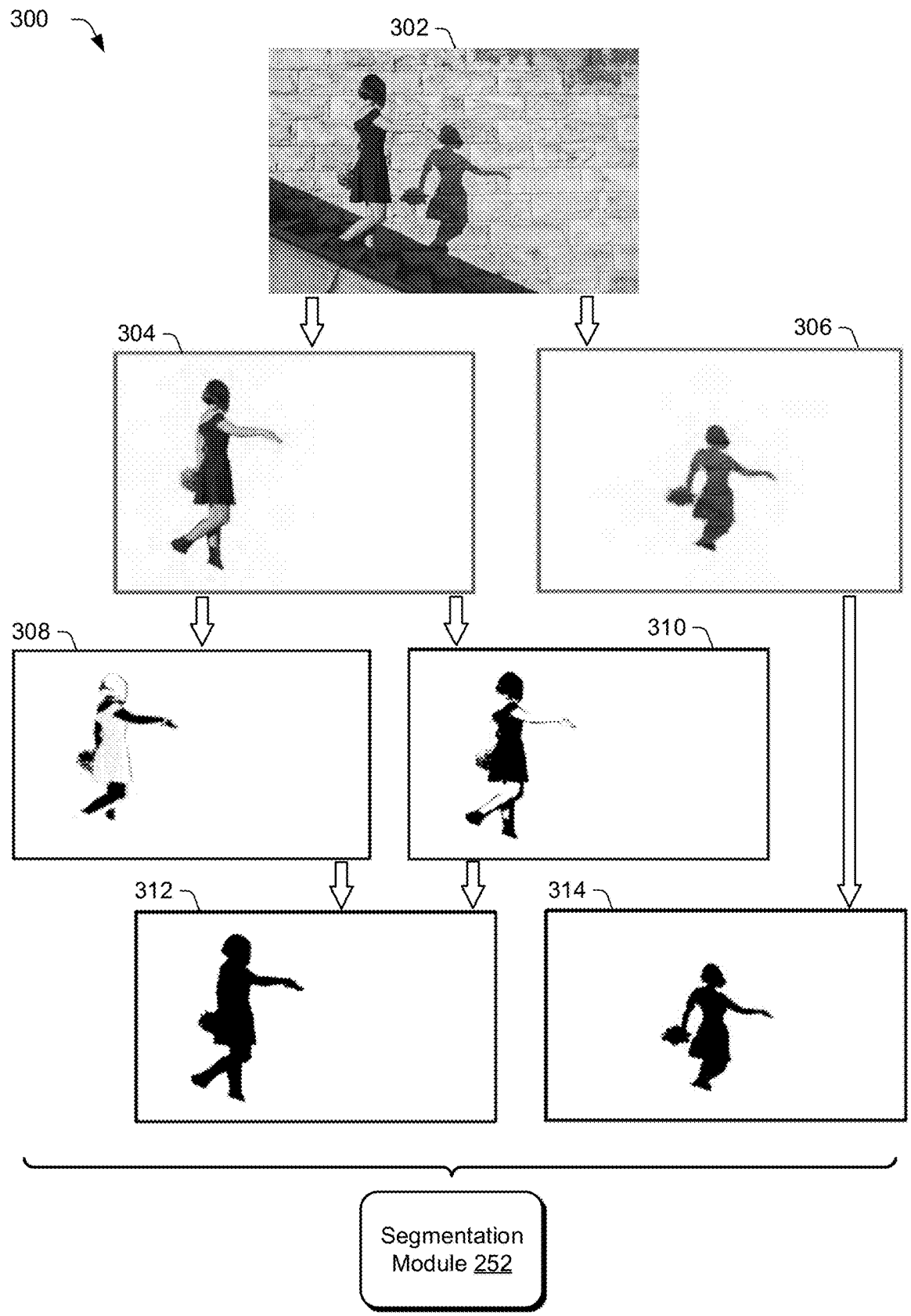
FIG. 3-FIG. 9 illustrate example images in accordance with one or more aspects of the disclosure.

FIG. 3 illustrates example images 300 in accordance with one or more aspects of the disclosure. Images 300 include image 302. Image 302 is an example of an input image provided to image editing system 208, such as a user-supplied image to be edited. Image 302 illustrates a woman and a shadow of the woman, as discussed above. Segmentation module 252 may determine that the woman is a first object and the shadow is an additional object that corresponds to the first object, and therefore the woman and shadow are to be segmented. Additionally or alternatively, user interface module 250 may expose a user interface that receives user selections indicating the woman as a first object and the shadow as an additional object corresponding to the first object, and that the woman and shadow are to be segmented. For instance, a user may select the woman and the shadow in image 302 by tracing with a cursor respective outlines of the woman and shadow, and enabling a "segment now" button in a user interface.

Images 300 also include segmentation images generated by segmentation module 252, including image 302, image 304, image 306, image 308, image 310, image 312, and image 314. For instance, based on image 302, segmentation module 252 generates image 304 and image 306. Image 304 includes pixels of image 302 corresponding to the woman, and image 306 includes pixels of image 302 corresponding to the shadow cast by the woman.

Based on image 304 in which a first object (e.g., the woman) is to be segmented, segmentation module 252 generates image 308 and image 310. Image 308 is an example of a color pixel map (e.g., a color mask) for the woman. A color pixel map is a mono bitmap of an object in an image, and indicates pixels of the object in the image that include color. For instance, pixels of the woman that include color in image 304 are represented by pixels of the woman in image 308 that are set to black, and pixels of the woman that do not include color in image 304 are represented by pixels of the woman in image 308 that are not set to black (e.g., the pixels are set to white). Hence, image 308 indicates the pixels of the woman in image 304 that include color.

Segmentation module 252 can generate a color pixel map in any suitable way. In one example, segmentation module 252 generates a color pixel map by transforming values of pixels of an object in one color space to a different color space. For instance, segmentation module 252 may transform pixel values in a red-green-blue (RGB) color space to a LAB color space. In a LAB color space, the L-dimension represents lightness, and the A-dimension and B-dimension represent color-opponent dimensions, such as green-red and blue-yellow color components, respectively.

To determine if a pixel of an object includes color, segmentation module 252 transforms RGB values of pixels of an object to LAB values, and sums A and B values. The result of the summation of A and B values is compared to a color threshold. If the result is greater than the color threshold, than the segmentation module 252 determines that the pixel includes color, and the corresponding pixel of the object in the color pixel map can be set to black. If the result is not greater than the color threshold, than segmentation module 252 determines that the pixel does not include color, and the corresponding pixel of the object in the color pixel map can be set to white.

In one example, segmentation module 252 fills holes of a color pixel map. Segmentation module 252 can fill holes of a color pixel map in any suitable way, such as by generating an inverted image of the color pixel map (e.g., setting black pixels to white and white pixels to black), removing components of the inverted image (e.g., small components having values less than an inverted component threshold), and inverting the inverted image with small components removed.

Segmentation module 252 also generates image 310. Image 310 is an example of a binarized image generated by segmentation module 252 based on image 304. Segmentation module 252 can generate a binarized image in any suitable way. In one example, segmentation module 252 generates a grayscale image from image 304, such as by applying a median filter to image 304 for noise removal, and assigning greyscale values to pixels of the filtered image. Segmentation module 252 may then generate a binarized image from the grayscale image using a binarization technique, such as by assigning binary values to pixels of the object in the binarized image based on comparing pixels of the grayscale image to a binary threshold. Pixels of the object in image 310 for which the binary threshold is satisfied are indicated as black pixels, and pixels of the object in image 310 for which the binary threshold is not satisfied are indicated as white pixels. In one example, segmentation module 252 binarizes a greyscale image using Otsu's binarization method.

Based on image 308 and image 310, segmentation module 252 generates image 312, including a binarized segmentation of the woman (e.g., a first object) in image 302. Segmentation module 252 generates image 312 by forming a union of the pixels of the object in image 308 that indicate color with the pixels of the object in image 310 for which the binary threshold is satisfied. For instance, if a pixel in image 308 or a pixel in image 310 is set to black, the corresponding pixel in image 312 is set to black. Hence, image 312 is a segmentation image that includes a binarized segmentation of the woman in image 302. In one example, segmentation module 252 post-processes image 312 by removing noise from image 312, such as by removing small components of image 312 and filling holes (e.g., regions of white pixels surrounded by black pixels) with black pixels.

Image 306 includes a segmentation of an additional object in image 302 corresponding to a first object in image 302. For instance, image 306 includes pixels of image 302 that represent a shadow of the woman in image 302. Unlike the woman in image 302, the shadow of the woman in image 302 does not include color information. Accordingly, segmentation module 252 generates image 314 based on image 306 without generating a color pixel map from image 302, as was done in image 308 from image 304. Image 314 includes a segmentation of the shadow of the woman in image 302, e.g., a binarized segmentation of the shadow of the woman.

Segmentation module 252 can generate image 314 based on image 306 in any suitable way. In the example in FIG. 3, segmentation module 252 generates image 314 by generating a grayscale image from image 306, such as by applying a median filter to image 306 for noise removal, and assigning greyscale values to pixels of the filtered image. Segmentation module 252 may then generate a binarized image from the grayscale image using a binarization technique, such as by assigning binary values to pixels of the additional object in the binarized image based on comparing pixels of the grayscale image to a binary threshold. Pixels of the additional object (e.g., the shadow) in image 314 for which the binary threshold is satisfied are indicated as black pixels, and pixels of the additional object in image 314 for which the binary threshold is not satisfied are indicated as white pixels. In one example, segmentation module 252 binarizes a greyscale image using Otsu's binarization method. Additionally or alternatively, segmentation module 252 may processes image 314 by removing noise from image 314, such as by removing small components of image 314 and filling holes (e.g., regions of white pixels surrounded by black pixels) with black pixels.

Accordingly, image 312 and image 314 includes binarized segmentations of the woman and shadow of image 302, respectively. In one example, segmentation module 252 generates a segmentation image that includes segmentations of multiple objects. For instance, segmentation module 252 may generate a single image including segmentations of the woman and the shadow of image 302 by taking a union of segmentations of image 312 and image 314. For instance, segmentation module 252 may generate a single image by taking the union of black pixels over image 312 and image 314.

Returning to FIG. 2, object segmentations determined by segmentation module 252, along with any suitable information, such as segmentation images, color pixel maps, greyscale images, binarized images, thresholds, an indication of a binarization method, filter parameters for noise filters, representations of color spaces, such as RGB or LAB color spaces, transformations from RGB to LAB color spaces, and the like, used by or calculated by segmentation module 252 are stored in segmentation data 234 of storage 232 and made available to modules of image editing application 248. In one example, segmentation module 252 provides representations of segmented objects (e.g., segmentation images such as image 312 and image 314 in FIG. 3) to skeletization module 254 and mesh module 260.

Skeletization module 254 is representative of functionality configured to generate a stick diagram of an object in an image. A stick diagram for the object includes line segments between nodes of the stick diagram. Skeletization module 254 can generate a stick diagram in any suitable way. In one example, skeletization module 254 receives segmentation images from segmentation module 252 (e.g., images including binarized segmentations of objects), and generates a respective stick diagram for each segmented object by generating a tree for each object, and successively thinning branches of the tree. Additionally or alternatively, skeletization module 254 may approximate multiple branches of a tree with a line segment to generate a stick diagram. Images generated by skeletization module 254 when generating stick diagrams of objects are illustrated in FIG. 4.

Figure 4:
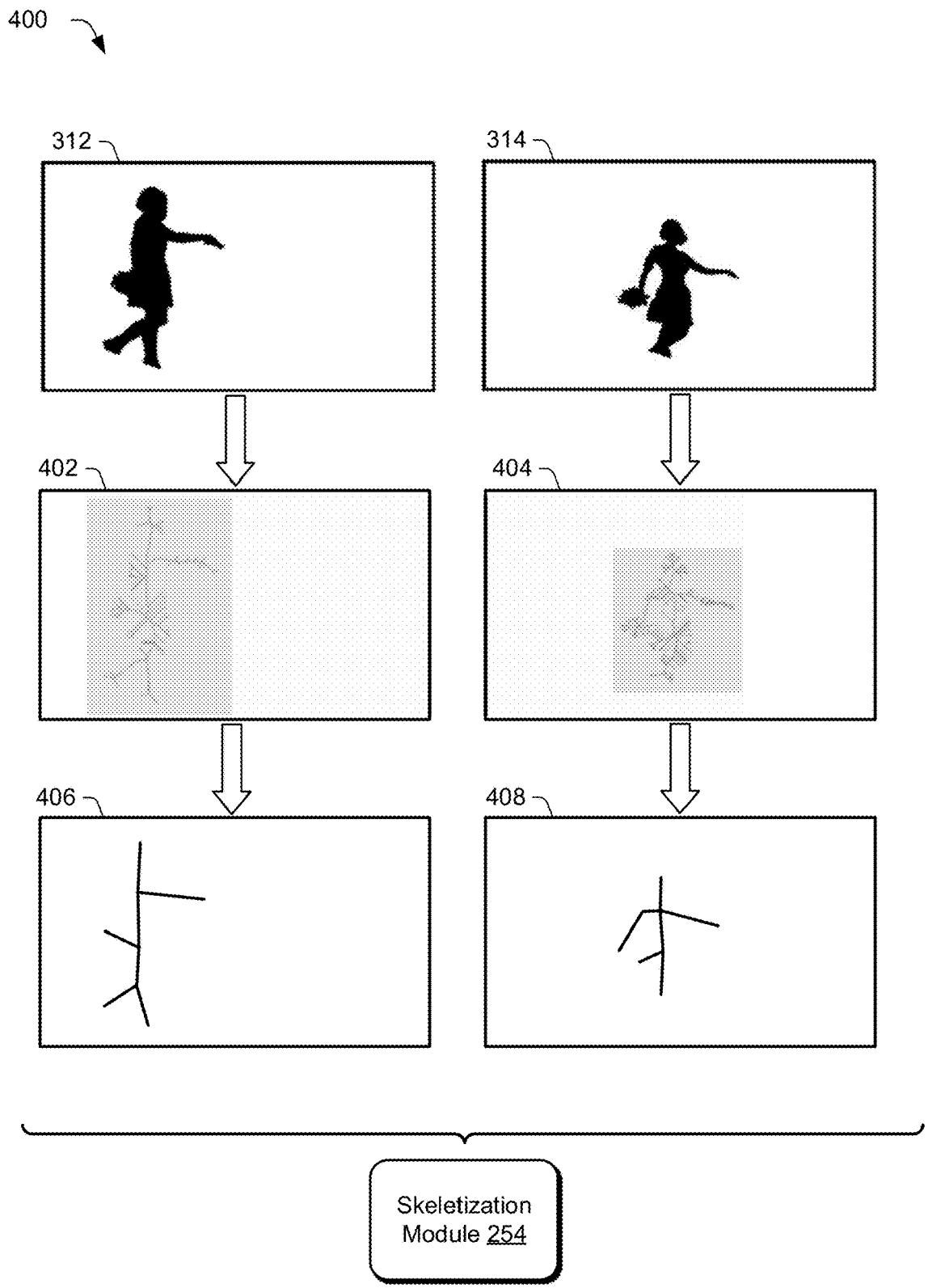

FIG. 4 illustrates example images 400 in accordance with one or more aspects of the disclosure. Images 400 include image 312 and image 314 generated by segmentation module 252, as described in the example in FIG. 3. Skeletization module 254 receives image 312 and image 314 from segmentation module 252, and generates image 402 based on image 312 and image 404 based on image 314.

Image 402 includes a tree (e.g., a skeleton) for the segmented object in image 312 (e.g., the woman), and image 404 includes a tree for the segmented object in image 314 (e.g., the shadow cast by the woman). Skeletization module 254 can generate a tree for an object in any suitable way, such as with a skeletization technique that reduces foreground regions in a binary image to a skeletal remnant that largely preserves the extent and connectivity of the original region while removing most of the original foreground pixels.

In the example in FIG. 4, the trees of image 402 and image 404 include many branches. Accordingly, skeletization module 254 generates image 406 and image 408 from image 402 and 404, respectively. Image 406 includes a stick diagram of the woman, and image 408 includes a stick diagram of the shadow cast by the woman. Skeletization module 254 can generate a stick diagram from a tree (e.g., a tree generated by a skeletization process) in any suitable way. In one example, skeletization module 254 generates a stick diagram by successively thinning branches of a tree, such as by removing small branches of a tree that have lengths less than a length threshold. Additionally or alternatively, skeletization module 254 may approximate multiple branches of a tree with a line segment. For instance, skeletization module 254 may replace two or more connected branches with a single line segment. In one example, skeletization module 254 replaces connected branches forming an angle within an angle threshold (e.g., ten degrees) of 180 degrees with a line segment.

Accordingly, skeletization module 254 generates image 406 that includes a stick diagram of the woman, and image 408 that includes a stick diagram of the shadow cast by the woman. Each stick diagram includes line segments between nodes of the stick diagram.

In one example, skeletization module 254 is configured to determine whether stick diagrams match one another, such as whether a stick diagram of image 406 matches a stick diagram of image 408. Skeletization module 254 may determine that stick diagrams match in any suitable way, such as by comparing coordinates of nodes of stick diagrams, angles between line segments of stick diagrams, lengths of line segments of stick diagrams, combinations thereof, and the like, as described below with regards to FIG. 5.

Returning again to FIG. 2, stick diagrams generated by skeletization module 254, along with any suitable information, such as skeletons, trees, branches removed from trees to generate a stick diagrams, branches replaced by line segments, thresholds, indicators of skeletization techniques, and the like, used by or calculated by segmentation module 252 are stored in skeletization data 236 of storage 232 and made available to modules of image editing application 248. In one example, skeletization module 254 provides representations of stick diagrams (e.g., image 406 and image 408 in FIG. 4) to object correspondence module 256 and point correspondence module 258.

Object correspondence module 256 is representative of functionality configured to generate a mapping of a first object to an additional object that corresponds to the first object, such as a shadow or reflection of the first object. In one example, object correspondence module 256 generates a mapping between objects by generating a mapping of a stick diagram of a first object to an additional stick diagram of an additional object. Examples of images used by object correspondence module 256 to generate a mapping are illustrated in FIG. 5.

Figure 5:
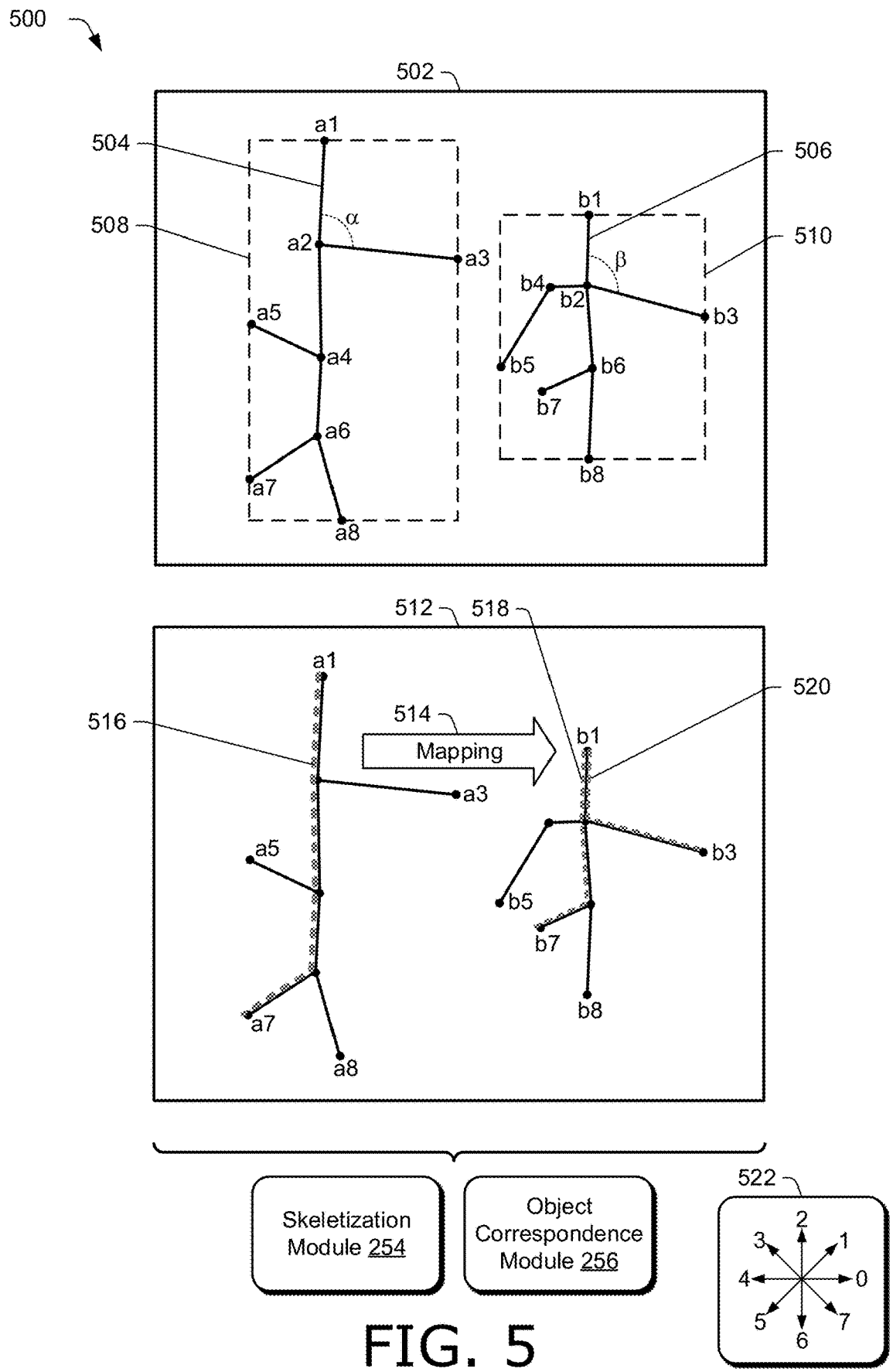

FIG. 5 illustrates example images 500 in accordance with one or more aspects of the disclosure. Images 500 include image 502 that includes stick diagrams for two objects. For instance, in the example in FIG. 5, image 502 includes the stick diagrams generated by skeletization module 254 in image 406 and image 408. Hence, image 502 includes stick diagram 504 and stick diagram 506, corresponding to the woman and shadow cast by the woman in image 302, respectively.

A stick diagram may have any suitable number of nodes connected by line segments. Stick diagram 504 includes nodes a1, a2, a3, a4, a5, a6, a7, and a8, of which nodes a1, a3, a5, a7, and a8 are end-points, and nodes a2, a4, and a6 are intermediate nodes. End-points are connected to only one line segment of a stick diagram. For instance, line segment a1-a2 connects nodes a1 and a2, and line segment a2-a4 connects nodes a2 and a4. Node a1 is an end-point because it is connected to only one line segment, a1-a2, while node a2 is an intermediate node since it is connected to more than one line segment of stick diagram 504. Accordingly, stick diagram 506 includes nodes b1, b2, b3, b4, b5, b6, b7, and b8, of which nodes b1, b3, b5, b7, and b8 are end-points, and nodes and nodes b2, b4, and b6 are intermediate nodes.

Object correspondence module 256 generates a mapping between stick diagram 504 and stick diagram 506, such as based on image editing system 208 determining that stick diagram 504 and stick diagram 506 match one another. For instance, when a user does not specify that objects correspond to one another, image editing system 208 may automatically and without user intervention determine that objects correspond to one another by comparing stick diagrams of the objects. In one example, skeletization module 254 determines that objects correspond to one another by matching stick diagrams of the objects. Additionally or alternatively, object correspondence module 256 may determine that objects correspond to one another by matching stick diagrams of the objects.

Image editing system 208 may determine that objects correspond to one another in any suitable way. In the example in FIG. 5, image editing system 208 determines that stick diagram 504 matches stick diagram 506 by comparing coordinates of nodes of the stick diagrams, angles between line segments of the stick diagrams, and lengths of line segments of the stick diagrams in normalized coordinate systems of the stick diagrams.

Accordingly, image 502 includes bounding box 508 and bounding box 510. Bounding box 508 and bounding box 510 are tight bounding boxes of the stick diagrams, and are determined from the end-points of the stick diagrams. For instance, bounding box 508 passes through end-points a1, a3, a7, and a8 of stick diagram 504. Bounding box 508 and bounding box 510 determine normalized coordinate systems for stick diagram 504 and stick diagram 506, respectively. For instance, bounding boxes may be normalized to a range, such as within [0, 1] on each side of a bounding box, so that parameters of stick diagrams (e.g., coordinates, lengths of line segments, and the like) may be compared in a same scale. For instance, by comparing a normalized length of line segment a1-a2 (e.g., a length of line segment a1-a2 computed in a normalized coordinate system determined by bounding box 508) and a normalized length of line segment b1-b2 (e.g., a length of line segment b1-b2 computed in a normalized coordinate system determined by bounding box 510), a scale-invariant comparison is made.

In one example, image editing system 208 determines that stick diagrams match one another by comparing coordinates of the stick diagrams computed in normalized coordinate systems of the stick diagrams. For instance, image editing system 208 may determine first coordinates of the nodes of stick diagram 504 in a normalized coordinate system for stick diagram 504 determined by bounding box 508, and second coordinates of the nodes of stick diagram 506 in a normalized coordinate system for stick diagram 506 determined by bounding box 510. Image editing system 208 may determine differences between the first coordinates and the second coordinates. Based on a number of the differences less than a proximity threshold being greater than a threshold number of nodes, image editing system 208 may determine that stick diagram 504 matches stick diagram 506. For instance, image editing system 208 may require that at least 70% of the nodes of stick diagram 504 have normalized coordinates within 0.1 (e.g., in horizontal and vertical dimensions, or Euclidean distance) of nodes of stick diagram 506 to determine that stick diagram 504 matches stick diagram 506.

Additionally or alternatively, image editing system 208 may determine that stick diagrams match one another by comparing lengths of line segments of the stick diagrams computed in normalized coordinate systems of the stick diagrams. For instance, image editing system 208 may determine first lengths of the line segments of stick diagram 504 in a normalized coordinate system for stick diagram 504 determined by bounding box 508, and second lengths of the line segments of stick diagram 506 in a normalized coordinate system for stick diagram 506 determined by bounding box 510. Image editing system 208 may determine differences between the first lengths and the second lengths. Based on a number of the differences less than a length difference threshold being greater than a length number threshold, image editing system 208 may determine that stick diagram 504 matches stick diagram 506. For instance, in coordinate systems normalized within zero and one by the bounding boxes, image editing system 208 may require that at least 70% of the line segments of stick diagram 504 have normalized lengths within 0.15 of lengths of stick diagram 506 to determine that stick diagram 504 matches stick diagram 506.

Additionally or alternatively, image editing system 208 may determine that stick diagrams match one another by comparing angles between line segments of the stick diagrams. For instance, in image 502 angle α depicts the angle between line segment a2-a3 and line segment a1-a2, and angle β depicts the angle between line segment b2-b3 and line segment b1-b2. Angles may or may not be computed in normalized coordinate systems determined by bounding boxes. Image editing system 208 may determine first angles between the line segments of stick diagram 504, and second angles between the line segments of stick diagram 506. Image editing system 208 may determine differences between the first angles and the second angles. Based on a number of the differences less than an angle difference threshold being greater than an angle number threshold, image editing system 208 may determine that stick diagram 504 matches stick diagram 506. For instance, image editing system 208 may require that at least 70% of the angles between line segments of stick diagram 504 are within ten degrees of angles between line segments of stick diagram 506 to determine that stick diagram 504 matches stick diagram 506.

Based on image editing system 208 determining that stick diagram 504 matches stick diagram 506, object correspondence module 256 generates a mapping of stick diagram 504 to stick diagram 506. This mapping is illustrated in image 512 with arrow 514. Object correspondence module 256 generates a mapping by determining skeleton paths of stick diagram 504 that match respective skeleton paths of stick diagram 506. A skeleton path of a stick diagram includes line segments connecting end-points in a shortest path. For instance, each end-point of a stick diagram is connected to an additional end-point of the stick diagram by a skeleton path that includes one or more line segments of the stick diagram.

In image 512, skeleton paths are illustrated with grey dotted lines. Skeleton path 516 connects end-point a1 with end-point a8 of stick diagram 504. For stick diagram 506, skeleton path 518 connects end-point b1 with end-point b7, and skeleton path 520 connects end-point b1 with end-point b3. Object correspondence module 256 determines that skeleton path 516 matches skeleton path 518, and that skeleton path 516 does not match skeleton path 520. Object correspondence module 256 can determine whether or not skeleton paths match in any suitable way, such as by comparing normalized coordinates of end-points of skeleton paths, normalized lengths of skeleton paths, and chain codes of skeleton paths.

In one example, object correspondence module 256 determines that differences between normalized lengths of skeleton paths are less than a distance threshold to determine that the skeleton paths match. For instance, object correspondence module 256 may calculate a length of skeleton path 516 in a normalized coordinate system determined by bounding box 508, and compare it to lengths of skeleton path 518 and skeleton path 520 that are calculated in a normalized coordinate system determined by bounding box 510. Object correspondence module 256 may require that the normalized length of skeleton path 516 is within a distance threshold (e.g., 0.1) of the normalized length of skeleton path 518 or skeleton path 520 to determine that skeleton path 516 matches skeleton path 518 or skeleton path 520. In the example in FIG. 5, the normalized length of skeleton path 516 is close to the normalized length of the skeleton path 518 according to a distance threshold, but not close to the normalized length of the skeleton path 520 according to the distance threshold. Accordingly, object correspondence module 256 may determine that skeleton path 516 matches skeleton path 518 but does not match skeleton path 520.

Additionally or alternatively, object correspondence module 256 may determine that differences between normalized coordinates of end-points of skeleton paths are less than a position threshold to determine that the skeleton paths match. For instance, object correspondence module 256 may calculate a coordinate of an end-point of skeleton path 516 (e.g., end-point a7) in a normalized coordinate system determined by bounding box 508, and compare it to coordinates of end-points of skeleton path 518 and skeleton path 520 (e.g., end-points b7 and b3, respectively) that are calculated in a normalized coordinate system determined by bounding box 510. Object correspondence module 256 may require that the normalized coordinate of skeleton path 516 be within a position threshold (e.g., 0.1 in horizontal and vertical dimensions, or Euclidean distance) of the normalized coordinate of skeleton path 518 or skeleton path 520 to determine that skeleton path 516 matches skeleton path 518 or skeleton path 520. In the example in FIG. 5, the normalized coordinates of end-points of skeleton path 516 (e.g., end-points a1 and a7) are close to the normalized coordinates of end-points of the skeleton path 518 (e.g., end-points b1 and b7, respectively) according to a position threshold, but not close to the normalized coordinates of end-points of the skeleton path 520 (e.g., end-points b1 and b3, respectively) according to the position threshold. Accordingly, object correspondence module 256 may determine that skeleton path 516 matches skeleton path 518 but does not match skeleton path 520.

Additionally or alternatively, object correspondence module 256 may determine that a skeleton path for one object matches a skeleton path for another object based on respective chain codes for the two objects. A chain code includes a sequence of symbols, each symbol representing a direction of the skeleton path at a sample of the skeleton path as the skeleton path is traversed from one end-point to the other end-point of the skeleton path. Key 522 includes eight symbols, numbered zero through seven, corresponding to a direction of a skeleton path at a sample of the skeleton path. For instance, as skeleton path 516 is traversed from end-point a1 to end-point a7, object correspondence module 256 generates a chain code for skeleton path 516.

In the example in FIG. 5, object correspondence module 256 generates chain code "666666655" for skeleton path 516 from end-point a1 to end-point a7. Object correspondence module 256 also generates chain code "6666655" for skeleton path 518 from end-point b1 to end-point b7, and chain code "6677" for skeleton path 520 from end-point b1 to end-point b3. To determine matching skeleton paths, object correspondence module 256 may compare the chain codes and generate a matching score for each pair of chain codes. A matching score may be based on a number of symbols of one chain code that equal symbols of another chain code. For instance, by comparing chain code "666666655" for skeleton path 516 and chain code "6666655" for skeleton path 518, object correspondence module 256 may determine that seven symbols of the chain code for skeleton path 518 match nine possible symbols of the chain code for skeleton path 516. Hence, object correspondence module 256 may generate a matching score of 7/9, or 77%, for skeleton path 516 and skeleton path 518.

By comparing chain code "666666655" for skeleton path 516 and chain code "6677" for skeleton path 520, object correspondence module 256 may determine that two symbols of the chain code for skeleton path 520 match nine possible symbols of the chain code for skeleton path 516. Hence, object correspondence module 256 may generate a matching score of 2/9, or 22%, for skeleton path 516 and skeleton path 520.

To determine that a pair of skeleton paths are matching skeleton paths, object correspondence module 256 may require that the matching score be greater than a threshold matching score, such as 66%. Hence, object correspondence module 256 may determine that skeleton path 516 matches skeleton path 518 but does not match skeleton path 520.

A mapping generated by object correspondence module 256 therefore includes pairs of skeleton paths, each pair including matching skeleton paths, e.g., a skeleton path of the stick diagram for a first object and a skeleton path of the stick diagram for an additional object that corresponds to the first object. By generating a mapping including pairs of matching skeleton paths, object correspondence module 256 generates a mapping that also includes corresponding points between respective objects of the matching skeleton paths.

For instance, by determining that skeleton path 516 matches skeleton path 518, the mapping includes that end-point b1 corresponds to end-point a1, thus mapping a location of end-point a1 on the woman to a location of end-point b1 on the shadow cast by the woman, and mapping a location of end-point a7 on the woman to a location of end-point b7 on the shadow cast by the woman. The mapping may also include a correspondence of intermediate nodes on matching skeleton paths that are not end-points. For instance, the mapping may include that a location of node a2 on the woman matches a location of node b2 on the shadow.

Returning again to FIG. 2, a mapping generated by object correspondence module 256, along with any suitable information, such as nodes of a stick diagram, bounding boxes of stick diagrams, normalized coordinate systems of stick diagrams, coordinates of end-points of a stick diagram, lengths of line segments, lengths of skeleton paths, angles between line segments, chain codes of skeleton paths, thresholds, pairs of matching skeleton paths, and the like, used by or calculated by object correspondence module 256 are stored in correspondence data 238 of storage 232 and made available to modules of image editing application 248. In one example, object correspondence module 256 provides a mapping to point correspondence module 258.

Point correspondence module 258 is representative of functionality configured to determine points for segmented objects, such as points determined from user-supplied anchor points and object edit points. Point correspondence module 258 may determine points for segmented objects in any suitable way. In one example, a user (e.g., user 202) supplies anchor points for an object, such as by clicking on locations of an object with a mouse. Point correspondence module 258 projects the anchor points to a stick diagram of an object to form projected points on the stick diagram. Additionally or alternatively, point correspondence module 258 may determine points on an additional stick diagram that correspond to points on a first stick diagram based on a mapping generated by object correspondence module 256. The points on the first stick diagram may be points projected onto the first stick diagram by point correspondence module 258, such as points corresponding to user-defined anchor points.

In one example, point correspondence module 258 determines a virtual object edit point for an additional object from an object edit point for a first object based on a mapping generated by object correspondence module 256. The additional object corresponds to the first object, such as including a shadow of the first object, a reflection of the first object, an object of a same class as the first object (e.g., the first object and the additional object may both include a car), combinations thereof, and the like. An object edit point corresponds to a location from which an object can be deformed. For instance, by selecting and dragging an object edit point in a direction, a user may warp an object in the direction, such as to move a person's arm. To illustrate how point correspondence module 258 determines points for segmented objects, consider FIG. 6.

Figure 6:
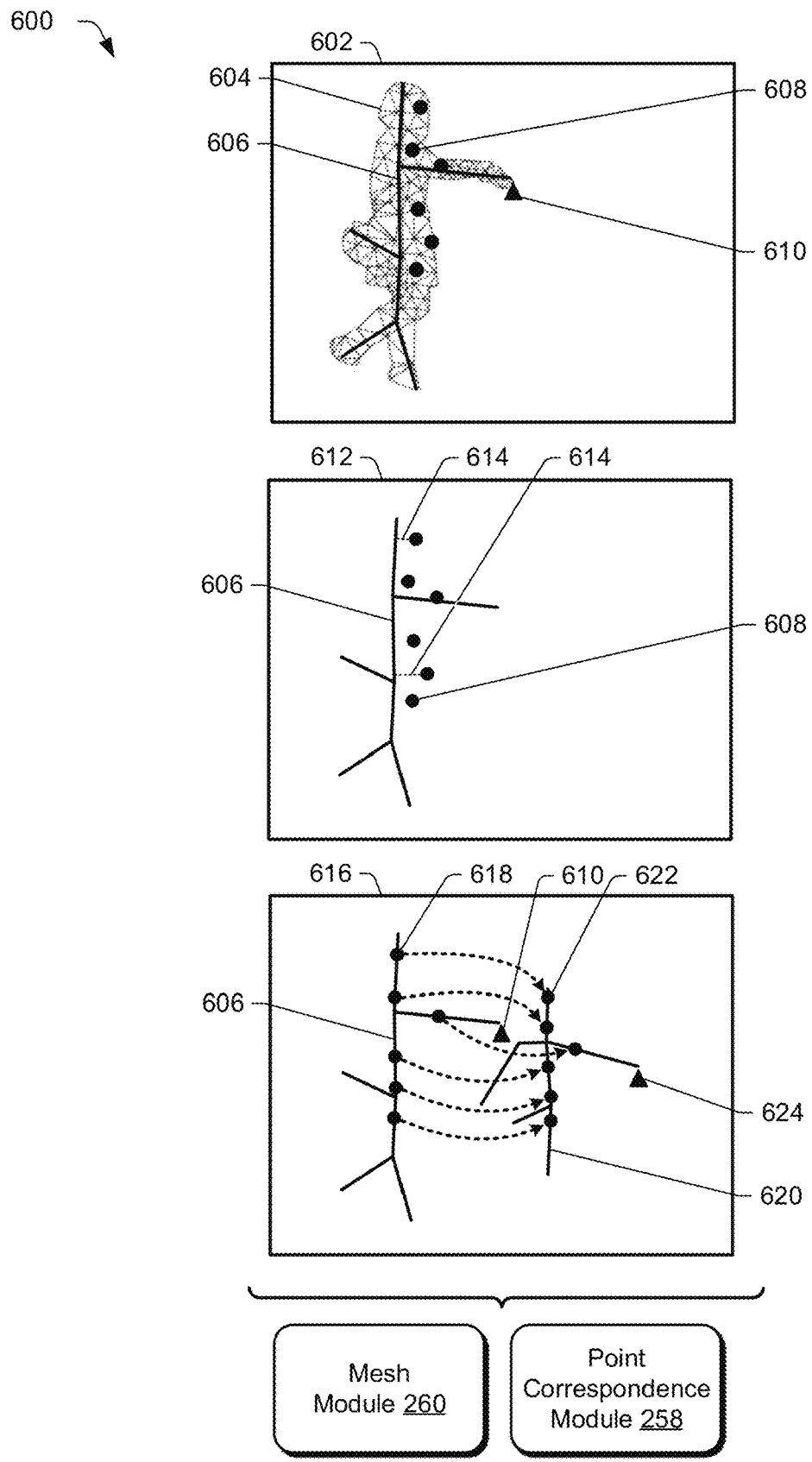

FIG. 6 illustrates example images 600 in accordance with one or more aspects of the disclosure. Images 600 include image 602. Image 602 includes triangle mesh 604 for the woman in image 302 of FIG. 3. Triangle mesh 604 is an example of a mesh generated by mesh module 260 for a segmented object (e.g., the woman). Image 602 also includes stick diagram 606 for the woman in image 302 of FIG. 3. Stick diagram 606 is an example of a stick diagram generated by skeletization module 254.

Image 602 also includes anchor points 608, illustrated in FIG. 6 as dark circles. For clarity, only one of the dark circles is numerically designated, though anchor points 608 include all dark circles in image 602. Anchor points 608 may be assigned by a user to limit deformation of an object (e.g., the woman) at locations of the anchor points when the object is warped. For instance, an anchor point may remain fixed at a location while an object is warped, thereby determining a shape of the object resulting from the warping. In one example, a user assigns an indicator to each of anchor points 608 to represent a degree of flexibility at an anchor point, such as a number between zero and ten, zero representing no flexibility (e.g., mesh at the anchor point remains fixed when the object is warped) and ten representing some flexibility (e.g., the mesh at the anchor point may move a limited amount when an object is warped).

Image 602 also includes object edit point 610, illustrated in FIG. 6 as a dark triangle. Object edit point 610 may be user-defined, and corresponds to a location from which triangle mesh 604 can be deformed. For instance, by selecting and dragging object edit point 610 in a direction, a user may warp triangle mesh 604 in the direction. Accordingly, by defining anchor points 608 and object edit point 610, a user may define how a triangle mesh of an object is warped, and thus the appearance of a deformed object resulting from the warped triangle mesh.

Images 600 also include image 612. Image 612 includes stick diagram 606 and anchor points 608, as discussed above. Image 612 also includes distances 614. For each of anchor points 608, point correspondence module 258 determines a respective distance from an anchor point to stick diagram 606, such as a shortest distance from the anchor point to a closest line segment of stick diagram 606. Image 612 illustrates these distances from anchor points 608 to stick diagram 606 with distances 614. For clarity, only two of anchor points 608 are illustrated having distances 614 to stick diagram 606, though point correspondence module 258 determines a respective distance from each anchor point to stick diagram 606. In one example, point correspondence module 258 determines a shortest respective distance from each anchor point to stick diagram 606, indicated by distances 614.

Images 600 also include image 616. Image 616 includes stick diagram 606 and projected points 618. Point correspondence module 258 determines projected points 618 by projecting anchor points 608 onto stick diagram 606 according to distances 614. For instance, for each of the anchor points 608, point correspondence module 258 projects the anchor point along one of distances 614 onto stick diagram 606. Hence, point correspondence module 258 projects anchor points 608 to respective locations on stick diagram 606 that are closest to the anchor points 608 to form projected points 618. For clarity, only one of the dark circles on stick diagram 606 representing projected points 618 is numerically designated, though projected points 618 includes all dark circles on stick diagram 606 in image 616.

Image 616 also includes stick diagram 620. Stick diagram 620 is an example of a stick diagram generated by skeletization module 254 for a shadow corresponding to a woman represented by stick diagram 606. For instance, stick diagram 620 is an example of stick diagram 506 in FIG. 5. For each of the projected points 618 on stick diagram 606, point correspondence module 258 determines a corresponding point on stick diagram 620. Image 616 therefore includes additional points 622. For clarity, only one of the dark circles on stick diagram 620 representing additional points 622 is numerically designated, though additional points 622 includes all dark circles on stick diagram 620 in image 616.

Point correspondence module 258 determines additional points 622 from projected points 618 based on a mapping generated by object correspondence module 256. For instance, for each of the projected points 618, point correspondence module 258 determines a skeleton path on stick diagram 606 to which the projected point belongs. Since the mapping generated by object correspondence module 256 includes pairs of matching skeleton paths, one for stick diagram 606 and one for stick diagram 620, point correspondence module 258 determines a skeleton path of stick diagram 620 corresponding to the skeleton path of stick diagram 606 on which the projected point lies. Point correspondence module 258 determines locations of additional points 622 on stick diagram 620 corresponding to projected points 618 on stick diagram 606 from relative positions of the points on the matching skeleton paths. This correspondence of projected points 618 to additional points 622 is illustrated in image 616 with dotted arrows.

Point correspondence module 258 also determines virtual object edit point 624 from object edit point 610. Virtual object edit point 624 is an object edit point for the shadow of the woman, and may not be explicitly user-specified. For instance, a user may specify object edit point 610 for a first object (e.g., a woman), and point correspondence module 258 determines virtual object edit point 624 for an additional object corresponding to the first object (e.g., a shadow of the woman). Point correspondence module 258 may determine a virtual object edit point from an object edit point in any suitable way. In the example in FIG. 6, point correspondence module 258 determines a location of virtual object edit point 624 from object edit point 610, projected points 618, and additional points 622. For instance, point correspondence module 258 determines distances of object edit point 610 to each of projected points 618. Using these distances and the locations of additional points 622, point correspondence module 258 determines a position of virtual object edit point 624, such as by minimizing differences of distances between virtual object edit point 624 and additional points 622, and distances between object edit point 610 and projected points 618.

Image editing system 208 uses projected points 618, additional points 622, object edit point 610, and virtual object edit point 624 to jointly warp the woman and the shadow cast by the woman, discussed below in more detail.

Returning again to FIG. 2, points for segmented objects determined by point correspondence module 258, along with any suitable information, such as anchor points, projected points resulting from projecting anchor points to a stick diagram, additional points on an additional stick diagram that are mapped from projected points on a first stick diagram, object edit points, virtual object edit points, distances between points and stick diagrams, differences of distances between points and stick diagrams, and the like, used by or calculated by point correspondence module 258 are stored in correspondence data 238 of storage 232 and made available to modules of image editing application 248. In one example, point correspondence module 258 provides projected points (e.g., projected points 618), additional points (e.g., additional points 622), an object edit point (e.g., object edit point 610), and a virtual object edit point (e.g., virtual object edit point 624) to mesh module 260.

Mesh module 260 is representative of functionality configured to generate meshes for segmented objects. Mesh module 260 can generate any suitable mesh in any suitable way. In one example, mesh module 260 generates a triangle mesh (e.g., a mesh including triangles connected at vertices of the mesh). For instance, mesh module 260 may generate a triangle mesh independent of a density of curves (e.g., Bezier segments) that represent an object, as described in "Generating a triangle mesh for an image represented by curves", U.S. patent application Ser. No. 15/861,908, filed Jan. 4, 2018, by V. Batra et al., the disclosure of which is incorporated herein by reference in its entirety.

Mesh module 260 also determines triangles of a triangle mesh to deform based on anchor points and an object edit point. Mesh module 260 can determine triangles to deform in any suitable way, such as triangles in a mesh that are proximate to an object edit point (e.g., having a distance to an object edit point within a threshold distance, such as within ten triangles of an object edit point), triangles between an object edit point and an anchor point or a projected anchor point (e.g., an anchor point projected onto a stick diagram), triangles having a particular position to an object edit point (e.g., to the left of an object edit point, to the right of an object edit point, on top of an object edit point, on the bottom of an object edit point, etc.), combinations thereof, and the like. An example of meshes generated by mesh module 260, and triangles to deform determined by mesh module 260, are illustrated in FIG. 7.

Figure 7:
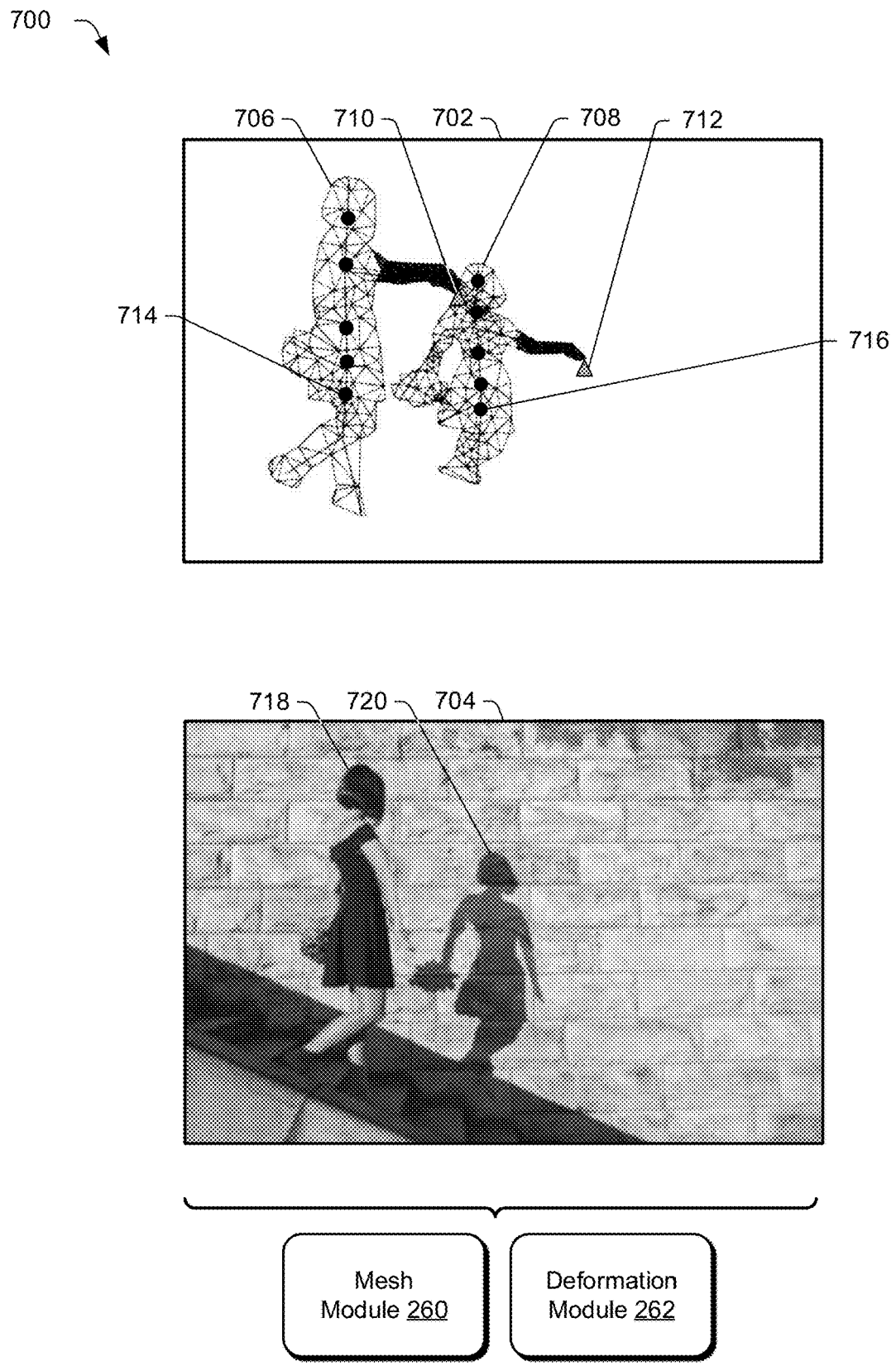

FIG. 7 illustrates example images 700 in accordance with one or more aspects of the disclosure. Images 700 include image 702 and image 704. Image 702 includes triangle mesh 706 and triangle mesh 708. Triangle mesh 706 and triangle mesh 708 are examples of triangle meshes generated by mesh module 260. For instance, triangle mesh 706 and triangle mesh 708 correspond to the woman and the shadow cast by the woman in image 302 in FIG. 3, respectively.

Image 702 also includes object edit point 710 for triangle mesh 706, and virtual object edit point 712 for triangle mesh 708. Object edit point 710 is an example of object edit point 610 in FIG. 6, such as a user-specified object edit point, and virtual object edit point 712 is an example of an object edit point generated by point correspondence module 258, such as virtual object edit point 624 in FIG. 6.

Image 702 also includes projected points 714 for triangle mesh 706, illustrated as dark circles on a stick diagram of triangle mesh 706. For clarity, only one of the dark circles for projected points 714 is numerically designated, though projected points 714 includes all dark circles on triangle mesh 706. Projected points 714 are examples of projected points 618 in FIG. 6, e.g., points generated by point correspondence module 258 by projecting anchor points to a stick diagram.

Image 702 also includes additional points 716 for triangle mesh 708, illustrated as dark circles on a stick diagram of triangle mesh 708. For clarity, only one of the dark circles for additional points 716 is numerically designated, though additional points 716 includes all dark circles on triangle mesh 708. Additional points 716 are examples of additional points 622 in FIG. 6, e.g., points generated by point correspondence module 258 by mapping projected points (e.g., projected points 618) on a first stick diagram to an additional stick diagram.

Based on object edit point 710 and projected points 714, mesh module 260 determines triangles of triangle mesh 706 to deform, indicated as shaded triangles of triangle mesh 706 in image 702. Mesh module 260 determines the shaded triangles in any suitable way, such as triangles of triangle mesh 706 that are proximate to object edit point 710, triangles of triangle mesh 706 between object edit point 710 and projected points 714, triangles of triangle mesh 706 on top of object edit point 710, and triangles of triangle mesh 706 to the left of object edit point 710.

Mesh module 260 determines triangles of triangle mesh 708 to deform in a similar manner as for triangle mesh 706. For instance, based on virtual object edit point 712 and additional points 716, mesh module 260 determines triangles of triangle mesh 708 to deform, indicated as shaded triangles of triangle mesh 708 in image 702. Mesh module 260 determines the shaded triangles in any suitable way, such as triangles of triangle mesh 708 that are proximate to virtual object edit point 712, triangles of triangle mesh 708 between virtual object edit point 712 and additional points 716, triangles of triangle mesh 708 on top of virtual object edit point 712, and triangles of triangle mesh 708 to the left of virtual object edit point 712.

In the example in FIG. 7, a user deforms triangle mesh 706 by dragging object edit point 710 downward, to lower the arm of the woman. In response to the warp request at object edit point 710, deformation module 262 jointly warps triangle mesh 706 and triangle mesh 708. Results of the warping are illustrated in image 704. In image 704, the arm of woman 718 is lowered based on dragging object edit point 710 downward in image 702. However, based on virtual object edit point 712, deformation module 262 jointly warps both woman 718 and shadow 720 cast by the woman, though a user may not explicitly drag virtual object edit point 712. Accordingly, the arm of shadow 720 is lowered together with the arm of the woman 718. In one example, deformation module 262 jointly warps woman 718 and shadow 720 by applying a similar set of transformations to the shaded triangles of triangle mesh 706 (e.g., translation and rotation of the shaded triangles of triangle mesh 706), and the shaded triangles of triangle mesh 708.

Returning again to FIG. 2, meshes generated by mesh module 260, along with any suitable information, such as projected points resulting from projecting anchor points to a stick diagram, additional points on an additional stick diagram that are mapped from projected points on a first stick diagram, object edit points, virtual object edit points, identifiers of triangles of a triangle mesh to be warped, and the like, used by or calculated by mesh module 260 are stored in mesh data 240 of storage 232 and made available to modules of image editing application 248. In one example, mesh module 260 provides triangle meshes with points (e.g., projected points such as projected points 714, object edit points such as object edit point 710, virtual object edit points such as virtual object edit point 712, and additional points such as additional points 716) to deformation module 262.

Deformation module 262 is representative of functionality configured to deform objects in digital images. In one example, deformation module 262 jointly deforms related objects in one or more images by warping together triangle meshes of the objects. Accordingly, deformation module 262 receives triangle meshes from mesh module 260. Triangle mesh 706 and triangle mesh 708 in FIG. 7 are examples of triangle meshes received by deformation module 262. In one example, deformation module 262 receives triangle meshes including indicators of triangles to be deformed in the triangle meshes, such as the shaded triangles of triangle mesh 706 and triangle mesh 708 in FIG. 7.

Deformation module 262 may also receive a warp request from user interface module 250. For instance, a user may select and drag an object edit point for an object in a user interface exposed by user interface module 250 to warp the object, and user interface module 250 may provide a warp request indicative of the user actions to deformation module 262. In one example, in response to receiving the warp request, deformation module 262 jointly warps the object and an additional object corresponding to the object, such as a shadow, reflection, similar object, combinations thereof, and the like.

Deformation module 262 can jointly warp an object and an additional object corresponding to the object in any suitable way. In one example, deformation module 262 jointly warps an object and an additional object corresponding to the object by applying a first set of transformations to triangles of a triangle mesh for the object and a second set of transformations to triangles of a triangle mesh for the additional object. A set of transformations may include one or more transformations, and a transformation may include translation and rotation operations, such as translation and rotation of triangles of a triangle mesh. The amounts of translation and rotation are based on the warp request, such as what direction and how far a user drags an object edit point.

In one example, the first set of transformations and the second set of transformations include a same set of transformations. For instance, deformation module 262 may apply a same transformation to the shaded triangles of triangle mesh 706 as the shaded triangles of triangle mesh 708 in FIG. 7 to generate image 702. Additionally or alternatively, the first set of transformations and the second set of transformations may include similar transformations, such as translations and rotations by similar amounts. A difference between the similar amounts may be based on the warp request, such as what direction a user drags an object edit point relative to an angle of a light source casting a shadow. For instance, when a user drags an object edit point in a direction of light emanating from a light source, a translation amount may be increased to emphasize shadow growth in that direction, compared to when a user drags an object edit point in a direction perpendicular from a direction of light emanating from a light source.

Deformed objects generated by deformation module 262, along with any suitable information, such as deformed triangle meshes, transformations applied, warp requests, and the like, used by or calculated by deformation module 262 are stored in storage 232 and made available to modules of image editing application 248. In one example, deformation module 262 deformed objects to user interface module 250, which exposes images including the deformed objects in a user interface.

Having considered an example digital medium environment, consider now a discussion of example images in accordance with one or more aspects of the disclosure.

Example Images

In the examples illustrated in FIG. 2-FIG. 7, an object is represented by a woman an additional object corresponding to the object is represented by a shadow cast by the woman. Image editing system 208 jointly edits both the object and the additional object based on an image editing request (e.g., a warp request) for the object. However, image editing system 208 is not limited to jointly editing an object and an additional object corresponding to the object for the case where the additional object is a shadow of the object. Rather, image editing system 208 can jointly edit an object and an additional object corresponding to the object for various types of additional objects, such as a reflection of an object, an additional object of a same object class as the object (e.g., both the object and the additional object include persons), and the like. Accordingly, FIG. 8 and FIG. 9 illustrate images of image editing system 208 when an additional object is a reflection of an object, and when an additional object is of a same object class as an object, respectively.

Figure 8:
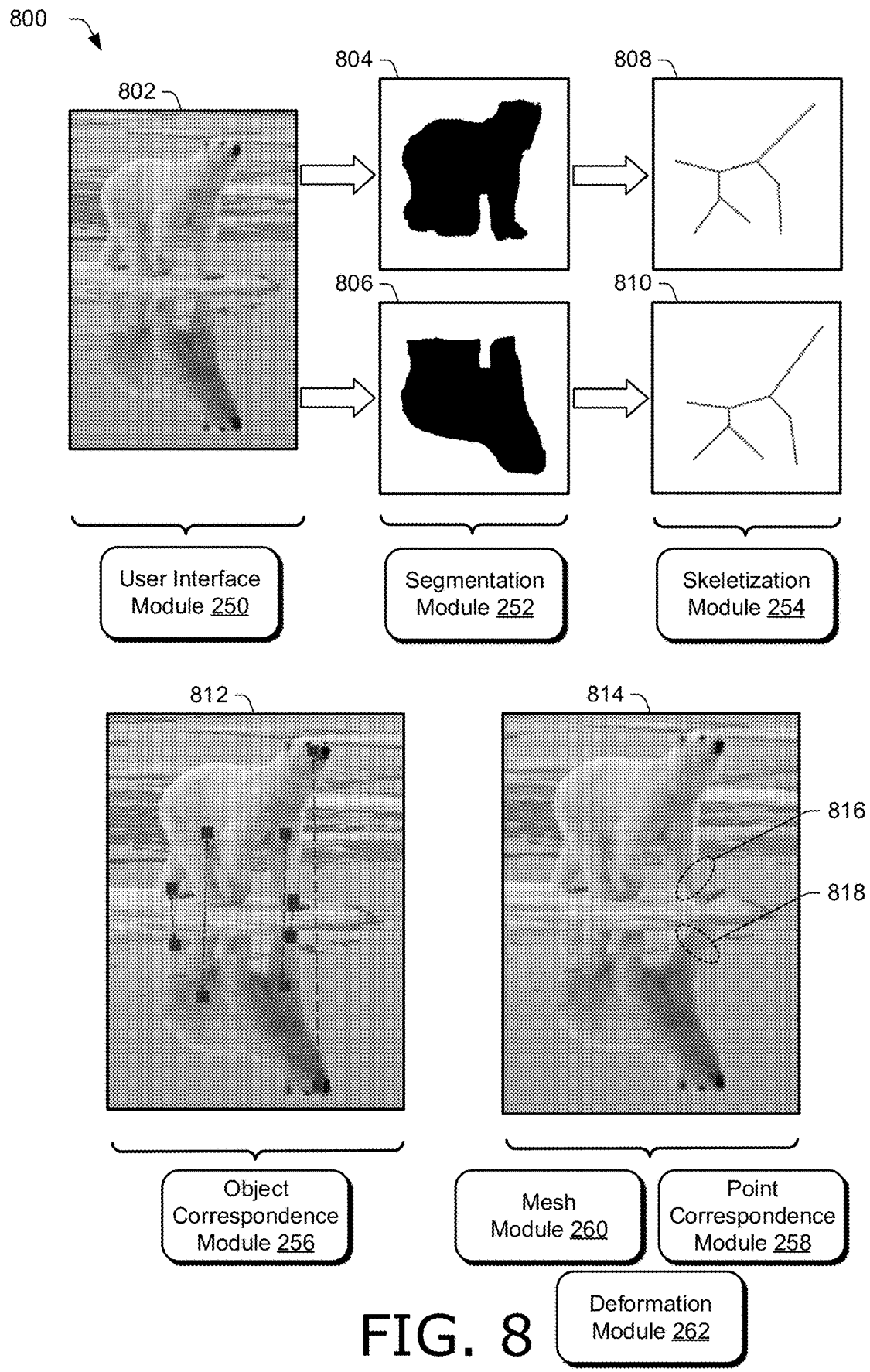
Figure 9:
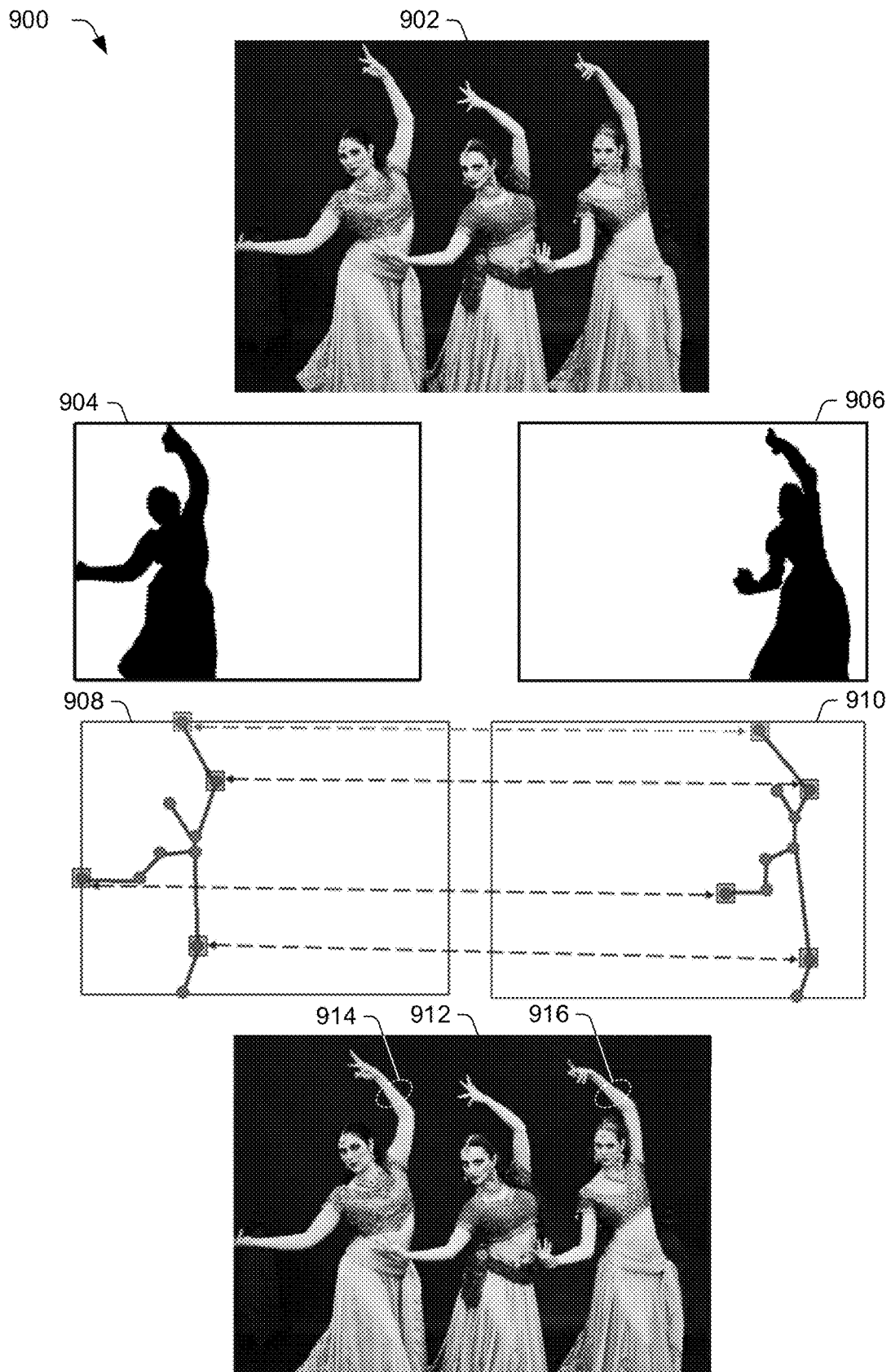

FIG. 8 illustrates example images 800 in accordance with one or more aspects of the disclosure. Images 800 include image 802. Image 802 is an example of an input image to be edited that is exposed in a user interface of user interface module 250. Image 802 includes an object (e.g., a polar bear) and an additional object corresponding to the object (e.g., a reflection of the polar bear). In the example in FIG. 8, image editing system 208 is used to jointly warp the polar bear and the reflection of the polar.

Segmentation module 252 generates segmentation image 804 and segmentation image 806 from image 802. Segmentation image 804 includes a binary segmentation of the polar bear, and segmentation image 806 includes a binary segmentation of the reflection of the polar bear. Based on segmentation image 804 and segmentation image 806, skeletization module 254 generates skeleton image 808 and skeleton image 810, respectively. Skeleton image 808 and skeleton image 810 include respective stick diagrams of the polar bear and the reflection of the polar bear. Note that the stick diagram in skeleton image 810 is flipped about the horizontal axis relative to the segmentation of the reflection of the polar bear in segmentation image 806, thus aligning the stick diagram in skeleton image 810 with the stick diagram in skeleton image 808. Image editing system 208 may flip any suitable image about any suitable axis, such as for alignment and correspondence purposes.

Object correspondence module 256 determines a mapping of the stick diagram in skeleton image 808 to the stick diagram in skeleton image 810 by matching skeleton paths of the stick diagrams in normalized coordinate systems, as described above. The mapping includes a correspondence of points on the polar bear to points on a reflection of the polar bear, as illustrated in image 812. In image 812, points on the reflection of the polar bear that correspond to points on the polar bear according to the mapping are illustrated as coupled by dotted lines. The points in image 812 may correspond to nodes of matching skeleton paths of the stick diagrams in skeleton image 808 and skeleton image 810.

Based on the mapping generated by object correspondence module 256, when a user warps the polar bear, such as by assigning anchor points and an object edit point for the polar bear and dragging the object edit point, point correspondence module 258, mesh module 260, and deformation module 262 work together to jointly deform the polar bear and the reflection of the polar bear. For instance, point correspondence module 258 projects the anchor points to the stick diagram of the polar bear, determines corresponding additional points on the stick diagram of the reflection of the polar bear, and determines a virtual object edit point for the reflection of the polar bear. Mesh module 260 generates triangle meshes for the polar bear and the reflection of the polar bear, and determines triangles of the triangle meshes to deform based on the points found by point correspondence module 258.

In the example in FIG. 8, image 814 shows results of the warping, in which deformation module 262 jointly warps the polar bear and the reflection of the polar bear. At ellipse 816, the polar bear's leg is lifted (e.g., to illustrate that the polar bear is walking). Accordingly, at ellipse 818 in the reflection of the polar bear, the leg is lifted together with the leg at ellipse 816.

FIG. 9 illustrates example images 900 in accordance with one or more aspects of the disclosure. Images 900 include image 902. Image 902 is an example of an input image to be edited that is exposed in a user interface of user interface module 250. Image 902 includes three dancers. Observe that the dancer in the middle has raised her arm at a different angle than the dancer on the left and the dancer on the right. Accordingly, image editing system 208 can be used to jointly warp the arms of the dancer on the left and the dancer on the right to match the arm of the dancer in the middle. A first object is represented as the dancer on the left, and an additional object corresponding to the first object is represented as the dancer on the right. Hence, in the example in FIG. 7, image editing system 208 is used to jointly edit objects of a same object class (e.g., dancers).

Images 900 also include segmentation image 904 and segmentation image 906. Image editing system 208 segments the dancer on the left and the dancer on the right from image 902, and generates segmentation image 904 and segmentation image 906, respectively. Segmentation image 904 and segmentation image 906 are examples of images generated by segmentation module 252. Segmentation image 904 includes a binary segmentation of the dancer on the left, and segmentation image 906 includes a binary segmentation of the dancer on the right.

Images 900 also include skeleton image 908 and skeleton image 910. Based on segmentation image 904 and segmentation image 906, image editing system 208 generates skeleton image 908 and skeleton image 910, respectively. For instance, skeletization module 254 may generate skeleton image 908 and skeleton image 910. Skeleton image 908 includes a stick diagram of the dancer on the left in image 902, and skeleton image 908 includes a stick diagram of the dancer on the right in image 902.

Images 900 also illustrate corresponding points between the stick diagrams of skeleton image 908 and skeleton image 910, shown connected by dotted arrows. The corresponding points are included in a mapping of the stick diagrams of skeleton image 908 and skeleton image 910 generated by image editing system 208. For instance, the corresponding points on the stick diagrams are nodes of matching skeleton paths on the stick diagrams. The mapping includes pairs of matching skeleton paths, each pair including a skeleton path on the stick diagram of skeleton image 908 and a skeleton path on the stick diagram of skeleton image 910. In one example, object correspondence module 256 generates the mapping.

Images 900 also include image 912. Image 912 illustrates results of jointly warping the dancer on the left and the dancer on the right in image 902 with image editing system 208. For instance, ellipse 914 and ellipse 916 indicate that the arm of the dancer on the left and the arm of the dancer on the right, respectively, have been warped and made to align with the arm of the dancer in the middle. To generate image 912, a user may drag an object edit point on the arm of the dancer on the left, and in response, image editing system 208 jointly warps both the arm of the dancer on the left and the arm of the dancer on the right.

Having considered example images, consider now a discussion of an example system usable to determine jointly edit related objects in a digital image in accordance with one or more aspects of the disclosure.

Example Image Editing System

Figure 10:
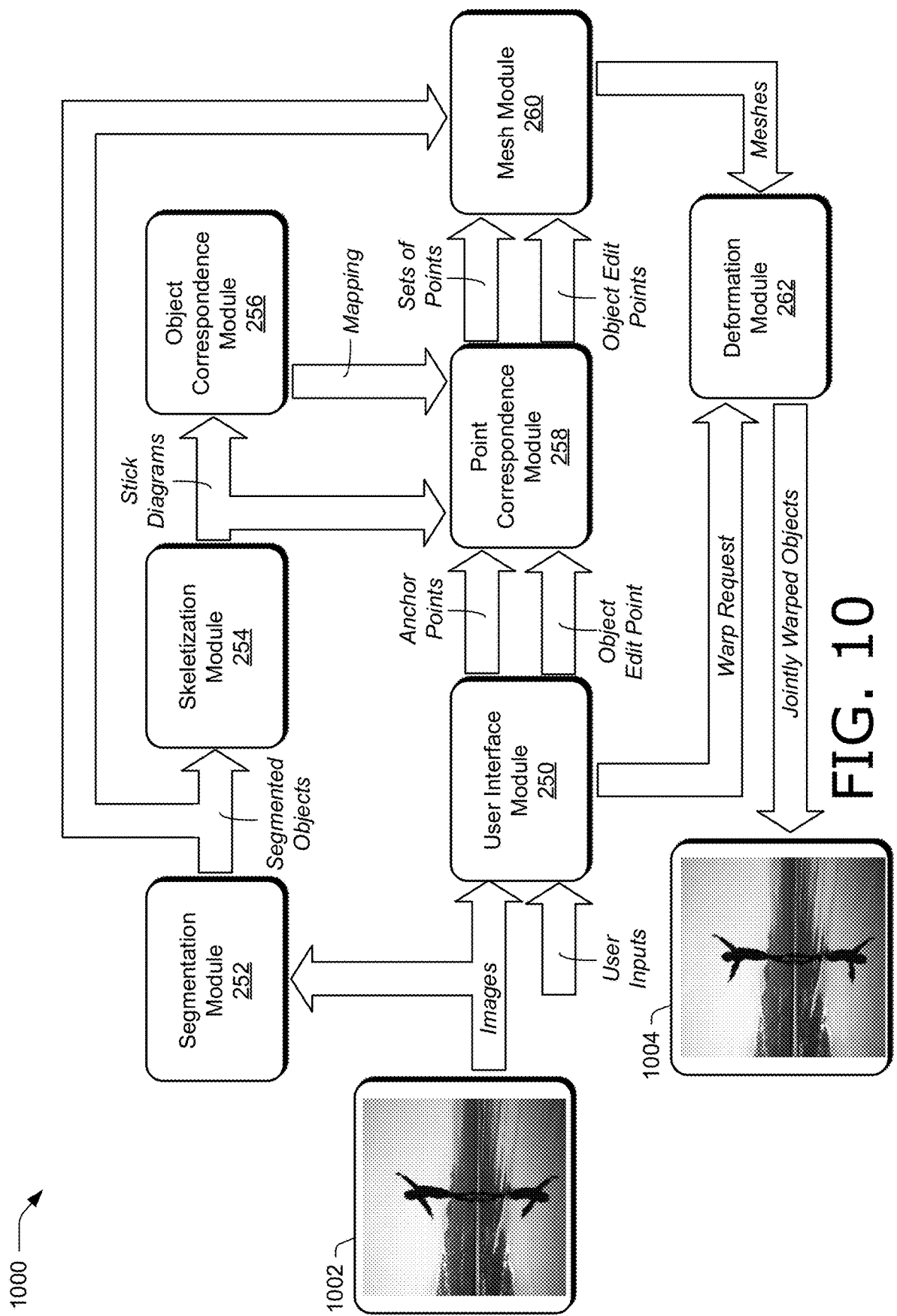
FIG. 10 illustrates an example system usable to jointly edit related objects in a digital image in accordance with one or more aspects of the disclosure.

FIG. 10 illustrates an example system 1000 usable to jointly edit related objects in a digital image in accordance with one or more aspects of the disclosure. In this implementation, system 1000 includes the modules of image editing application 248 as described in FIG. 2, e.g., user interface module 250, segmentation module 252, skeletization module 254, object correspondence module 256, point correspondence module 258, mesh module 260, and deformation module 262. System 1000 is one example of image editing system 208 that can be constructed using the modules of image editing application 248. For instance, signals can be redefined, and modules can be modified, combined, divided, added, or removed to form a modified system, without altering the functionality of system 1000. Accordingly, such modified systems are considered to be within the scope of the disclosure.

Furthermore, for simplicity system 1000 is limited to the modules of image editing application 248 and a description of some of their interconnects. System 1000 can, however, include any suitable signals and communications between modules omitted for simplicity. Such signals may include system clocks, counters, image indicators, sequence indicators, reset signals, and the like. In one example, system 1000 can operate in real time (e.g., with no perceptible delay to a user). Accordingly, signals can be calculated by the modules of system 1000 and communicated between the modules of system 1000 without significant delay, so that an image may be edited and the results exposed in a user interface without perceptible delay to a user.

Moreover, system 1000 can be implemented on any suitable device or devices. In one example, system 1000 is implemented on one computing device (e.g., one of computing devices 204 in FIG. 2). In another example, system 1000 is implemented on more than one computing device. For instance, parts of system 1000 can be implemented by a first computing device, such as computing device 204-1 in FIG. 2, and other parts of system 1000 can be implemented by an additional computing device or devices, such as computing device 204-2. In one example, a server implements parts of system 1000, such as server 222 in FIG. 2. A server can be remote, e.g., because it is not collocated with the first computing device. A server may be configured to receive signals of system 1000 from a computing device (e.g., one or more of computing devices 204), process the received signals, such as with image editing support system 224, and transmit results of the processing back to the computing device. Hence, image editing support system 224 of server 222 in FIG. 2 may include system 1000.

Additionally or alternatively, parts of system 1000 can be implemented by an additional computing device that is collocated with a first computing device. For instance, one of computing devices 204 may be a first computing device, and another of computing devices 204 may be an additional, collocated computing device. The first computing device and the additional computing device may be operated by one or more users. Hence, system 1000 provides for multiple users within an environment to share data included in system 1000.

System 1000 obtains input image 1002, such as a user-provided image to be edited, and generates output image 1004, in which an object (e.g., a person) and an additional object corresponding to the object (e.g., a reflection of the person) are jointly edited by warping together the person and the reflection of the person based on user input to warp the person. Input image 1002 is provided to user interface module 250 and segmentation module 252.

Segmentation module 252 receives input image 1002 and segments an object (e.g., a person) and an additional object corresponding to the object (e.g., a reflection of the person). In one example, segmentation module 252 segments the object and the additional object based on system 1000 determining, automatically and without user intervention, that the additional object corresponds to the object. In another example, a user specifies that the additional object corresponds to the object, such as by tracing an outline of the person in input image 1002 with a mouse curser, tracing an outline of a reflection of the person in input image 1002 with a mouse cursor, and enabling a "correspondence" button in a user interface of user interface module 250.

Segmentation module 252 can segment the object and the additional object in any suitable way. In one example, segmentation module 252 generates one or more segmentation images, each segmentation image including one or more segmented objects. For instance, a segmentation image may designate regions that correspond to an object with a first pixel value (e.g., black), and regions of the image that do not correspond to the object with a second pixel value (e.g., white). Segmentation module 252 provides representations of segmented objects (e.g., segmentation images including segmentations of the person and the reflection of the person in input image 1002) to mesh module 260 and skeletization module 254.

Skeletization module 254 receives representations of segmented objects from segmentation module 252 and generates respective stick diagrams for the segmented objects, such as a stick diagram for the person in input image 1002 and an additional stick diagram for the reflection of the person in input image 1002. Each stick diagram includes line segments between nodes of the stick diagram, each endpoint of the stick diagram connected to an additional endpoint of the stick diagram by a skeleton path that includes one or more of the line segments.

In one example, skeletization module 254 is configured to determine whether the stick diagram for the object (e.g., the person) matches the additional stick diagram for the additional object (e.g., the reflection of the person). Based on determining that the stick diagrams match, skeletization module 254 may enable system 1000 to determine a mapping between the stick diagrams, such as by providing the stick diagrams to object correspondence module 256 and point correspondence module 258. Skeletization module 254 an provide any suitable representation of stick diagrams to object correspondence module 256 and point correspondence module 258, such as one or more skeleton images, each skeleton image including one or more stick diagrams, a numerical representation of stick diagrams, such as a listing of coordinates of nodes of a stick diagram and a description of line segments connecting the nodes, combinations thereof, and the like.

Object correspondence module 256 receives representations of stick diagrams from skeletization module 254 and generates a mapping of one stick diagram to one or more other stick diagrams. For the example in FIG. 1000 with input image 1002, object correspondence module 256 generates a mapping between the stick diagram for the person in input image 1002 and the stick diagram for the reflection of the person in input image 1002.

Object correspondence module 256 can generate any suitable mapping. In one example, object correspondence module 256 generates a mapping including pairs of matching skeleton paths, each pair including a skeleton path from the stick diagram for the person in input image 1002 and a skeleton path from the stick diagram for the reflection of the person in input image 1002. Additionally or alternatively, object correspondence module 256 can generates a mapping including nodes on the stick diagram for the person in input image 1002 that match nodes on the stick diagram for the reflection of the person in input image 1002. Object correspondence module 256 provides a mapping to point correspondence module 258.

To edit input image 1002, user interface module receives user inputs, including anchor points (e.g., locations on the person in input image 1002 that are to remain fixed when the person is warped), and an object edit point (e.g., a location from which the user may warp the person, such as by dragging the object edit point with a mouse). User interface module 150 provides a representation of the anchor points and a representation of the object edit point to point correspondence module 258, such as coordinates of the anchor points and object edit point, indicators of a degree of rigidity of anchor points (e.g., a number between one and ten), and the like.

Point correspondence module 258 receives representations of the anchor points and object edit point from user interface module 250, a mapping from object correspondence module 256, and representations of stick diagrams for the segmented objects from skeletization module 254. Point correspondence module 258 projects the anchor points onto the stick diagram for the object (e.g., the person in input image 1002) to form projected points, and based on the mapping, determines a set of additional points on an additional stick diagram for the additional object (e.g., the reflection of the person in input image 1002). Point correspondence module 258 also determines a location of a virtual object edit point for the additional object based on a location of the object edit point for the object relative to the projected points, and the set of additional points determined from the projected points.

Point correspondence module 258 provides sets of points to mesh module 260. For instance, point correspondence module 258 may provide a set of projected points formed by projecting anchor points onto the stick diagram of an object (e.g., the person in input image 1002), and a set of additional points on the stick diagram for an additional object corresponding to the object (e.g., the reflection of the person in input image 1002). Point correspondence module 258 also provides object edit points to mesh module 260, including a user-designated object edit point for the object and a virtual object edit point for the additional object corresponding to the object.

Mesh module 260 receives representations of segmented objects from segmentation module 252, and object edit points and sets of points from point correspondence module. Mesh module 160 generates a triangle mesh for each segmented object, such as a triangle mesh for the person in input image 1002 and a triangle mesh for the reflection of the person in input image 1002. Based on the object edit points and the sets of points, mesh module 160 also determines triangles of each of the triangle meshes to warp. Mesh module 260 provides triangle meshes for each segmented object to deformation module 262, including indications in each of the triangle meshes of triangles to warp based on the object edit points and the sets of points.

User interface module 250 receives user inputs, including a warp request. For instance, a user may select an object edit point with a mouse and drag the object edit point to a new location, indicating to warp an object (e.g., the person in input image 1002). Accordingly, user interface module 250 provides the warp request (e.g., a new location of the object edit point) to deformation module 262.

Deformation module 262 receives a warp request from user interface module 250 and triangle meshes from mesh module 260, and jointly deforms the triangle meshes based on the warp request. Deformation module 262 may deforms the triangle meshes by applying one or more transformations to each of the triangles of the triangle meshes that are indicated to be warped. Deformation module 262 may apply any suitable transformation. In one example, deformation module 262 applies a same transformation to triangles of the triangle mesh for the object and triangles of the triangle mesh for the additional object corresponding to the object. Additionally or alternatively, deformation module 262 can apply a first transformation to triangles of the triangle mesh for the object and a second transformation similar to the first transformation to triangles of the triangle mesh for the additional object corresponding to the object.

By jointly deforming the triangle meshes of segmented objects, deformation module 262 jointly deforms the object and the additional object based on a user request (e.g., a warp request) for the object. Output image 1004 shows the results of system 1000 when a warp request indicates to raise the person's arm in input image 1002. In output image 1004, not only has the person's arm been raised, but also the reflection of the person has also been warped to match the person's raised arm, resulting in a realistic output image.

The systems described herein constitute an improvement over systems that do not jointly edit related objects in a digital image and require a user to individually edit objects. The systems described herein generate respective stick diagrams for a first object and an additional object corresponding to the first object, such a shadow cast by the first object, a reflection of the first object, or an object of a same object class as the first object. Based on the stick diagrams, the systems described herein generate a mapping of the first object to the additional object. Based on a user request to edit the first object, such as to warp the first object, the systems described herein jointly edit the first object and the additional object using the mapping by determining corresponding points for the object and the additional object. Accordingly, the systems described herein efficiently generate realistic digital images that maintain correspondence between related objects, without requiring a user to edit each object individually, thus saving time and resources.

Having considered example systems, consider now a discussion of example procedures for jointly editing related objects in a digital image in accordance with one or more aspects of the disclosure.

Example Procedures

Figure 11:
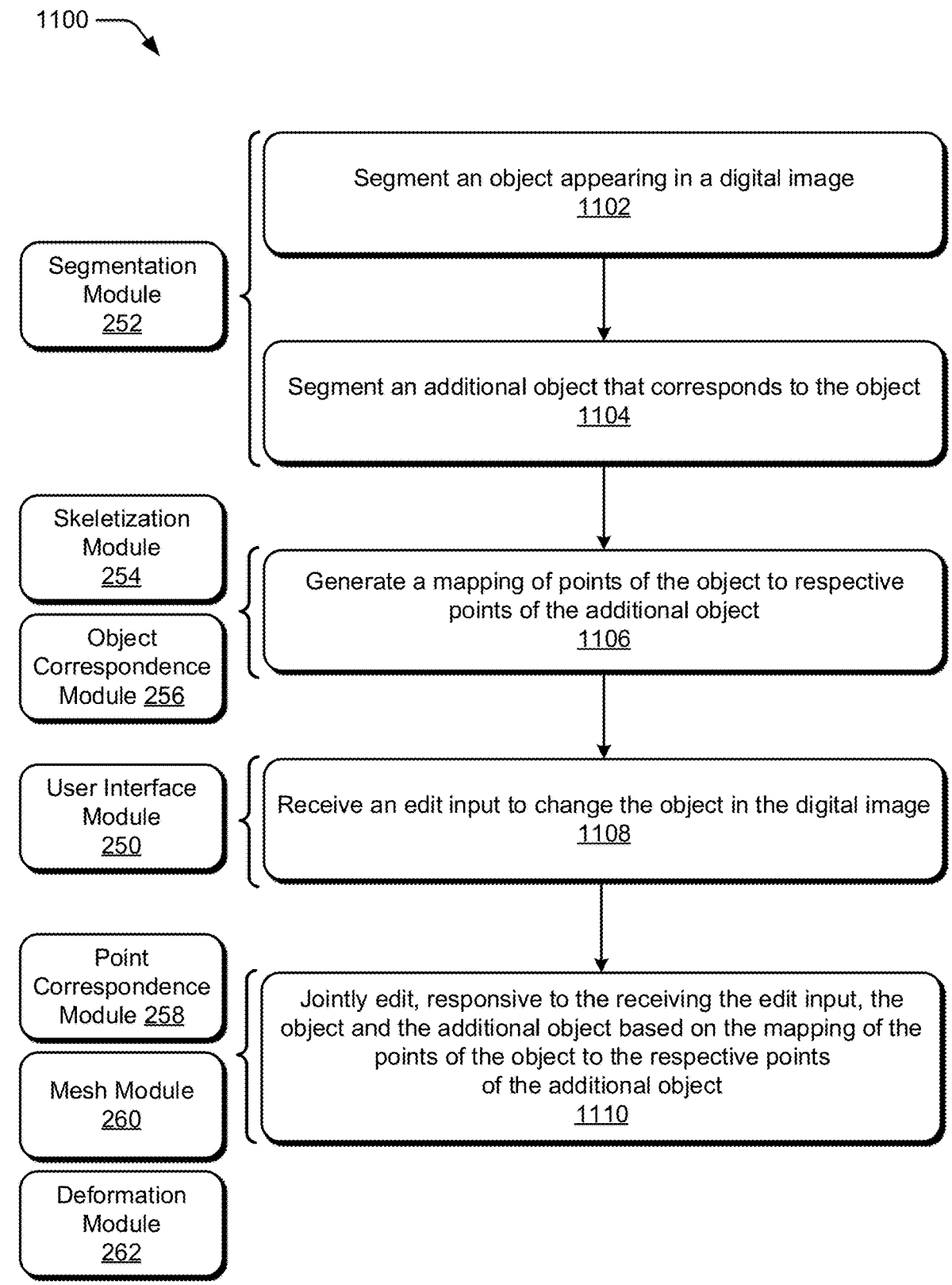
FIG. 11 illustrates a flow diagram depicting an example procedure in accordance with one or more aspects of the disclosure.

FIG. 11 illustrates an example procedure 1100 for jointly editing related objects in a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 222 of FIG. 2 that makes use of an image editing system, such as system 1000 or image editing system 208. An image editing system implementing procedure 1100 may be an independent application that has been installed on the computing device, a service hosted by a service provider that is accessible by the computing device, a plug-in module to the computing device, or combinations thereof.

An object appearing in a digital image is segmented (block 1102). In one example, segmentation module 252 segments an object appearing in a digital image. For instance, segmentation module 252 may segment an object appearing in a digital image by generating a segmentation image that includes a binary segmentation of the object.

An additional object that corresponds to the object is segmented (block 1104). In one example, segmentation module 252 segments an additional object that corresponds to the object. For instance, segmentation module 252 may segment an additional object by generating a segmentation image that includes a binary segmentation of the additional object. In one example, the additional object appears in the digital image and includes at least one of a shadow of the object, a reflection of the object, or a similar object of a same object class as the object.

Additionally or alternatively, the additional object can appear in a different digital image than the digital image and be segmented from the different digital image, the additional object corresponding to the object by including the object in the different digital image, and the digital image and the different digital image corresponding to different image frames of a video sequence.

In one example, segmenting the object appearing in the digital image includes generating a color pixel map for the object in the digital image, the color pixel map including map pixels that indicate pixels of the object in the digital image that include color, generating a grayscale image from the object in the digital image, generating a binarized image from the grayscale image by assigning binary values to pixels of the object in the binarized image based on comparing grayscale pixels of the grayscale image to a binary threshold, and forming a union of the map pixels in the color pixel map with the pixels of the object in the binarized image for which the binary threshold is satisfied. A mapping of points of the object to respective points of the additional object is generated (block 1106). In one example, skeletization module 254 generates respective stick diagrams for the object and the additional object, and object correspondence module 256 generates a mapping of points of the object to respective points of the additional object by generating a mapping of points on the stick diagram for the object to respective points on the stick diagram for the additional object.

In one example, the mapping of the points of the object to the respective points of the additional object is generated by determining respective skeletons of the object and the additional object, each respective skeleton including skeleton paths connecting pairs of end-points of said each respective skeleton, determining matching skeleton paths on the respective skeletons, the matching skeleton paths including a first skeleton path on the respective skeleton of the object that matches a second skeleton path on the respective skeleton of the additional object, projecting anchor points onto the respective skeleton of the object to form the points of the object, and determining the respective points of the additional object from the points of the object based on the matching skeleton paths.

In one example, determining the matching skeleton paths on the respective skeletons includes determining a difference between a length of the first skeleton path and a length of the second skeleton path is less than a distance threshold, the length of the first skeleton path and the length of the second skeleton path computed in respective normalized coordinate systems determined for the object and the additional object.

Additionally or alternatively, determining the matching skeleton paths on the respective skeletons can include determining a difference between a coordinate of an end-point of the first skeleton path and a coordinate of an end-point of the second skeleton path is less than a position threshold, the coordinate of the end-point of the first skeleton path and the coordinate of the end-point of the second skeleton path computed in respective normalized coordinate systems determined for the object and the additional object. For instance, respective bounding boxes of the object and the additional object may be determined, and the respective normalized coordinate systems may determine from the respective bounding boxes.

Additionally or alternatively, determining the matching skeleton paths on the respective skeletons may include generating a first chain code for the first skeleton path, the first chain code including a sequence of first symbols indicating directions of the first skeleton path at samples of the first skeleton path, generating a second chain code for the second skeleton path, the second chain code including a sequence of second symbols indicating directions of the second skeleton path at samples of the second skeleton path, and determining that a number of the first symbols of the first chain code equal to the second symbols of the second chain code is greater than a chain code threshold.

An edit input to change the object in the digital image is received (block 1108). In one example, user interface module 250 receives an edit input to change the object in the digital image. For instance, a user may grab an object edit point and drag it with a mouse.

Responsive to the receiving the edit input, the object and the additional object are jointly edited based on the mapping of the points of the object to the respective points of the additional object (block 1110). In one example, point correspondence module 258, mesh module 260, and deformation module 262 jointly edit, responsive to the receiving the edit input, the object and the additional object based on the mapping of the points of the object to the respective points of the additional object.

In one example, the edit includes an indication to warp the first object in the digital image, and the jointly editing includes deforming the object in the digital image and deforming the additional object in the digital image. For instance, the edit input can be to warp the object in the digital image, and the jointly editing includes similarly deforming the object and the additional object in the digital image.

Additionally or alternatively, mesh module 260 may generate a first triangle mesh for the object and a second triangle mesh for the additional object. An object edit point for the first triangle mesh may be determined based on the edit input, and point correspondence module 258 may determine a virtual object edit point for the second triangle mesh based on the object edit point and the mapping. For instance, a virtual object edit point for the second triangle mesh may be determined that correlates to the object edit point based on the mapping. Mesh module 260 may determine a first set of triangles of the first triangle mesh based on the object edit point and a second set of triangles of the second triangle mesh based on the virtual object edit point. For instance, mesh module 260 may determine a first set of triangles to change in the first triangle mesh based on the object edit point and a second set of triangles to change in the second triangle mesh based on the virtual object edit point. The deforming the object and the deforming the additional object may include applying a same or similar set of transformations to the first set of triangles and the second set of triangles. For instance, similarly deforming the object and the additional object may include applying a set of transformations to both the first set of triangles and the second set of triangles.

Figure 12:
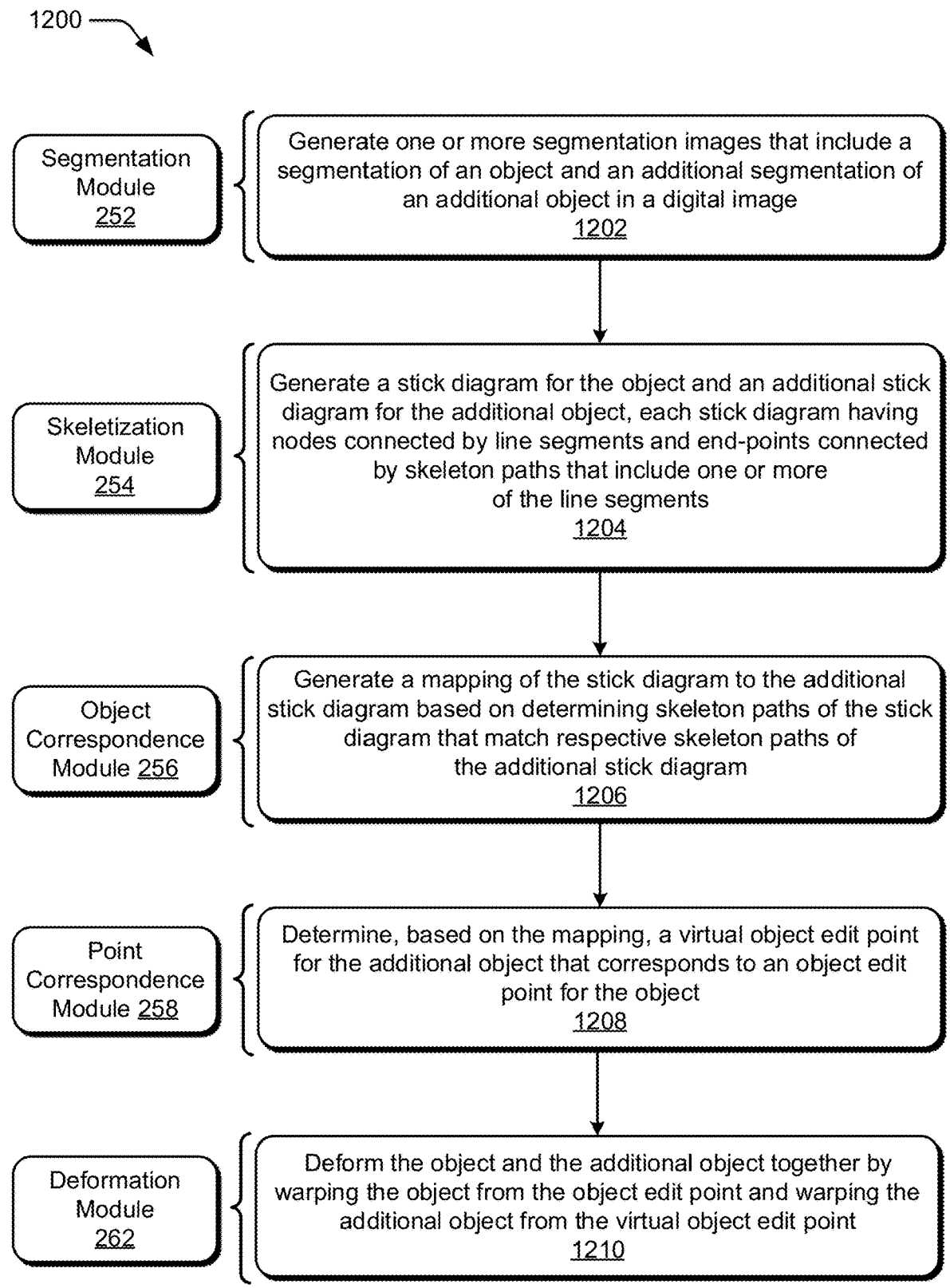
FIG. 12 illustrates a flow diagram depicting an example procedure in accordance with one or more aspects of the disclosure.

FIG. 12 illustrates an example procedure 1200 for jointly editing related objects in a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 222 of FIG. 2 that makes use of an image editing system, such as system 1000 or image editing system 208. An image editing system implementing procedure 1200 may be an independent application that has been installed on the computing device, a service hosted by a service provider that is accessible by the computing device, a plug-in module to the computing device, or combinations thereof.

One or more segmentation images that include a segmentation of an object and an additional segmentation of an additional object in a digital image are generated (block 1202). In one example, segmentation module 252 generates one or more segmentation images that include a segmentation of an object and an additional segmentation of an additional object in a digital image. Additionally or alternatively, the additional object may include at least one of a shadow of the object, a reflection of the object, or an object of a same object class as the object.

A stick diagram for the object and an additional stick diagram for the additional object are generated, each stick diagram having nodes connected by line segments and end-points connected by skeleton paths that include one or more of the line segments (block 1204). In one example, skeletization module 254 generates a stick diagram for the object and an additional stick diagram for the additional object, each stick diagram having nodes connected by line segments and end-points connected by skeleton paths that include one or more of the line segments. For instance, each stick diagram may include line segments between nodes of said each stick diagram, each end-point of said each stick diagram connected to an additional end-point of said each stick diagram by a skeleton path that includes one or more of the line segments.

Additionally or alternatively, skeletization module 254 can be configured to determine that the stick diagram for the object matches the additional stick diagram for the additional object by determining first coordinates of the nodes of the stick diagram in a normalized coordinate system for the stick diagram, determining second coordinates of the nodes of the additional stick diagram in a normalized coordinate system for the additional stick diagram, determining differences between the first coordinates and the second coordinates, and determining that a number of the differences less than a proximity threshold is greater than a threshold number of nodes.

Additionally or alternatively, skeletization module 254 can be configured to determine that the stick diagram for the object matches the additional stick diagram for the additional object by determining first angles between the line segments of the stick diagram, determining second angles between the line segments of the additional stick diagram, determining differences between the first angles and the second angles, and determining that that number of the differences less than an angle difference threshold is greater than an angle number threshold.

Additionally or alternatively, skeletization module 254 can be configured to determine that the stick diagram for the object matches the additional stick diagram for the additional object by determining first lengths of the line segments of the stick diagram, determining second lengths of the line segments of the additional stick diagram, determining differences between the first lengths and the second lengths, and determining that that number of the differences less than a length difference threshold is greater than a length number threshold.

A mapping of the stick diagram to the additional stick diagram is generated based on determining skeleton paths of the stick diagram that match respective skeleton paths of the additional stick diagram (block 1206). In one example, object correspondence module 256 generates a mapping of the stick diagram to the additional stick diagram based on determining skeleton paths of the stick diagram that match respective skeleton paths of the additional stick diagram.

In one example, determining the skeleton paths of the stick diagram that match the respective skeleton paths of the additional stick diagram includes at least one of determining differences between lengths of the skeleton paths and lengths of the respective skeleton paths are less than a distance threshold, determining differences between coordinates of end-points of the skeleton paths and coordinates of end-points of the respective skeleton paths are less than a position threshold, and determining that numbers of first symbols of first chain codes of the skeleton paths that equal second symbols of second chain codes of the respective skeleton paths are greater than a chain code threshold, the first chain codes and the second chain codes indicating directions of the skeleton paths and the respective skeleton paths, respectively.

Based on the mapping, a virtual object edit point for the additional object is determined that corresponds to an object edit point for the object (block 1208). In one example, point correspondence module 258 determines, based on the mapping, a virtual object edit point for the additional object that corresponds to an object edit point for the object.

The object and the additional object are deformed together by warping the object from the object edit point and warping the additional object from the virtual object edit point (block 1210). In one example, deformation module 262 deforms the object and the additional object together by warping the object from the object edit point and warping the additional object from the virtual object edit point.

In one example, mesh module 260 generates triangle meshes, and point correspondence module 258 is configured to project anchor points for the object onto the stick diagram to form projected points, and determine, based on the mapping, additional points on the additional stick diagram that correspond to the projected points on the stick diagram. Mesh module 260 may be configured to determine, based on the projected points and the object edit point, a set of triangles of a triangle mesh of the object, and determine, based on the additional points and the virtual object edit point, an additional set of triangles of an additional triangle mesh of the additional object. The object and the additional object can be deformed together including using a same transformation to both the set of triangles and the additional set of triangles. Additionally or alternatively, the object and the additional object can be deformed together including applying a similar transformation to both the set of triangles and the additional set of triangles.

Figure 13:
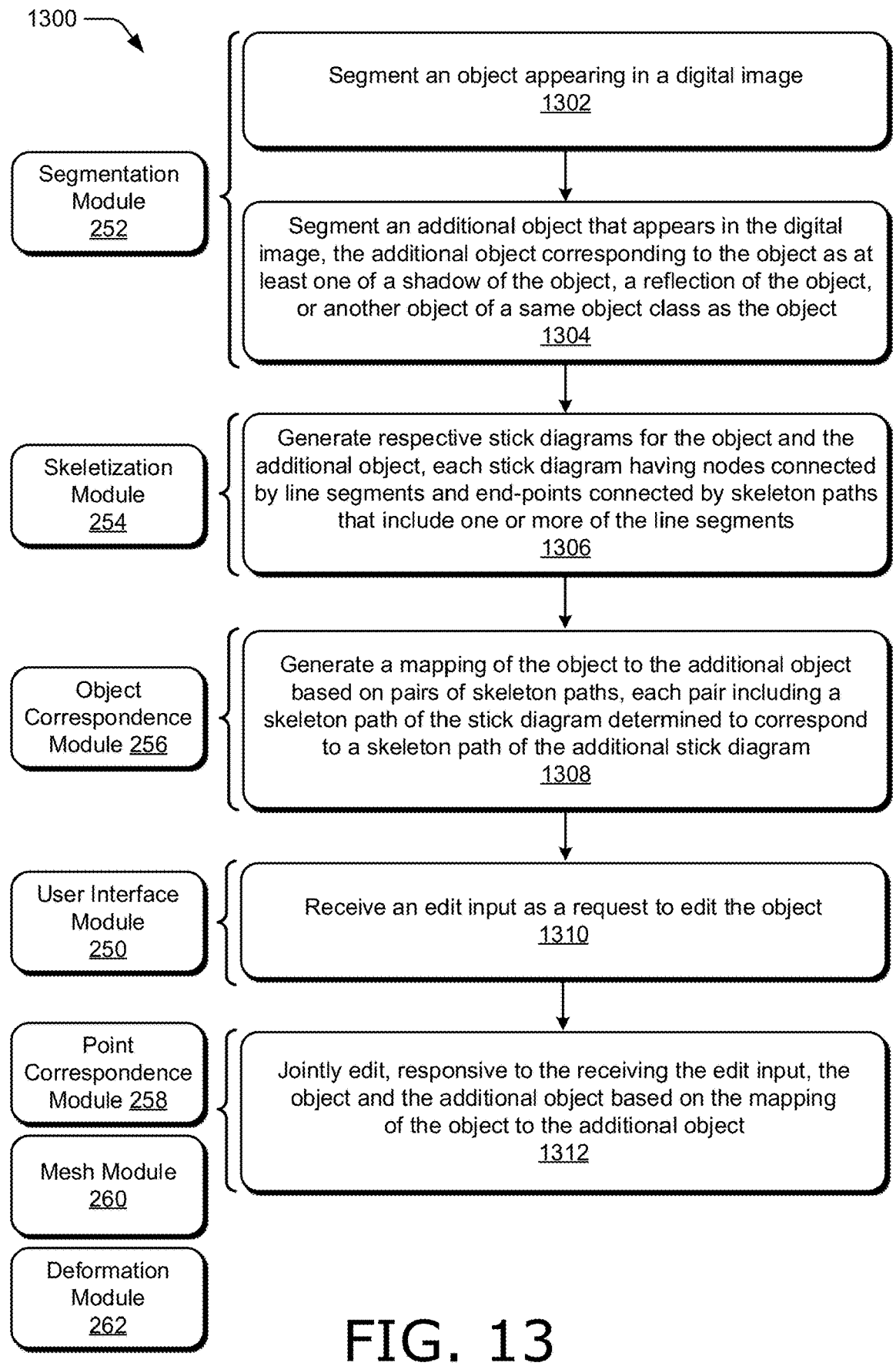
FIG. 13 illustrates a flow diagram depicting an example procedure in accordance with one or more aspects of the disclosure.

FIG. 13 illustrates an example procedure 1300 for jointly editing related objects in a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 222 of FIG. 2 that makes use of an image editing system, such as system 1000 or image editing system 208. An image editing system implementing procedure 1300 may be an independent application that has been installed on the computing device, a service hosted by a service provider that is accessible by the computing device, a plug-in module to the computing device, or combinations thereof.

An object appearing in a digital image is segmented (block 1302). In one example, segmentation module 252 segments an object appearing in a digital image, such as by generating a segmentation image including a binary segmentation of the object.

An additional object that appears in the digital image is segmented, the additional object corresponding to the object as at least one of a shadow of the object, a reflection of the object, or another object of a same object class as the object (block 1304). In one example, segmentation module 252 segments an additional object in the digital image, the additional object corresponding to the object as at least one of a shadow of the object, a reflection of the object, or another object of a same object class as the object.

Respective stick diagrams for the object and the additional object are generated, each stick diagram having nodes connected by line segments and end-points connected by skeleton paths that include one or more of the line segments (block 1306). In one example, skeletization module 254 generates respective stick diagrams for the object and the additional object, each stick diagram having nodes connected by line segments and end-points connected by skeleton paths that include one or more of the line segments. For instance, each stick diagram may include line segments between nodes of said each stick diagram, each end-point of said each stick diagram connected to an additional end-point of said each stick diagram by a respective skeleton path that includes one or more of the line segments.

A mapping of the object to the additional object is generated based pairs of skeleton paths, each pair including a skeleton path of the stick diagram determined to correspond to a skeleton path of the additional stick diagram (block 1308). In one example, object correspondence module 256 generates a mapping of the object to the additional object based on pairs of skeleton paths, each pair including a skeleton path of the stick diagram determined to correspond to a skeleton path of the additional stick diagram.

An edit input is received as a request to edit the object (block 1310). In one example, user interface module 250 receives an edit input as a request to edit the object.

Responsive to the receiving the edit input, the object and the additional object are jointly edited based on the mapping of the object to the additional object (block 1312). In one example, point correspondence module 258, mesh module 260, and deformation module 262 jointly edit, responsive to the receiving the edit input, the object and the additional object based on the mapping of the object to the additional object. Additionally or alternatively, the request to edit the object indicates to warp the object, and jointly editing includes similarly warping the object and the additional object in the digital image.

In one example, segmentation module 252 binarizes the object and the additional object to form a binarized object and a binarized additional object, respectively, and the respective stick diagrams are generated based on the binarized object and the binarized additional object.

The procedures described herein constitute an improvement over procedures that do not jointly edit related objects in a digital image and require a user to individually edit objects. The procedures described herein segment a first object in a digital image, and an additional object corresponding to the first object, such a shadow cast by the first object, a reflection of the first object, or an object of a same object class as the first object. The procedures described herein generate respective stick diagrams for the first object and the additional object that have been segmented, and based on the stick diagrams, generate a mapping of the first object to the additional object. Based on a user request to edit the first object, such as to warp the first object, the procedures described herein jointly edit the first object and the additional object using the mapping by determining corresponding points for the object and the additional object. Accordingly, the procedures described herein efficiently generate realistic digital images that maintain correspondence between related objects, without requiring a user to edit each object individually, thus saving time and resources.

Having considered example procedures in accordance with one or more implementations, consider now example systems and devices that can be utilized to practice the inventive principles described herein.

Example Systems and Devices

FIG. 14 illustrates an example system generally at 1400 that includes an example computing device 1402 that is representative of one or more computing systems and devices that may implement the various techniques described herein. This is illustrated through inclusion of image editing system 208, system 1000, image editing application 248, and image editing support system 224, which operate as described above. Computing device 1402 may be, for example, a user computing device (e.g., one of computing devices 204), or a server device of a service provider, (e.g., server 222). Furthermore, computing device 1402 may include an on-chip system, multiple computing devices, combinations thereof, or any other suitable computing device or computing system. Accordingly, FIG. 14 illustrates computing device 1402 as one or more of a tablet, a laptop computer, a smart phone, smart eye glasses, and a camera, though these examples are illustrative and in no way are meant to limit the type or number of devices included in computing device 1402.

The example computing device 1402 includes a processing system 1404, one or more computer-readable media 1406, and one or more I/O interfaces 1408 that are communicatively coupled to each other. Although not shown, computing device 1402 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1404 is representative of functionality to perform one or more operations using hardware. Accordingly, processing system 1404 is illustrated as including hardware elements 1410 that may be configured as processors, functional blocks, and so forth. This may include implementation in hardware as an application specific integrated circuit or other logic device formed using one or more semiconductors. Hardware elements 1410 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 230 in FIG. 2 are an example of processing system 1404.

Computer-readable storage media 1406 is illustrated as including memory/storage 1412. Storage 232 in FIG. 2 is an example of memory/storage included in memory/storage 1412. Memory/storage 1412 may include volatile media (such as random access memory (RAM)), nonvolatile media (such as read only memory (ROM), Flash memory, optical disks, magnetic disks, and so forth), or combinations thereof. Memory/storage 1412 may include fixed media (e.g., RAM, ROM, a fixed hard drive, and so on) as well as removable media (e.g., Flash memory, a removable hard drive, an optical disc, and so forth). Computer-readable media 1406 may be configured in a variety of other ways as further described below.

Input/output interfaces 1408 are representative of functionality to allow a user to enter commands and information to computing device 1402, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1402 may be configured in a variety of ways as further described below to support user interaction.

Computing device 1402 also includes applications 1414. Applications 1414 are representative of any suitable applications capable of running on computing device 1402, and may include a web browser which is operable to access various kinds of web-based resources (e.g., assets, media clips, images, content, configuration files, services, user profiles, and the like). Applications 1414 include image editing application 248, as previously described. Furthermore, applications 1414 includes any applications supporting image editing system 208, system 1000, and image editing support system 224.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1402. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1410, or combinations thereof. Computing device 1402 may be configured to implement particular instructions and functions corresponding to the software and hardware modules. Accordingly, implementation of a module that is executable by computing device 1402 as software may be achieved at least partially in hardware, e.g., through use of computer-readable storage media and hardware elements 1410 of processing system 1404. The instructions and functions may be executable/operable by one or more articles of manufacture (for example, one or more computing devices such as computing device 1402 or processing systems such as processing system 1404) to implement techniques, modules, and examples described herein.

The techniques described herein may be supported by various configurations of computing device 1402 and are not limited to the specific examples of the techniques described herein. This functionality may also be implemented all or in part through use of a distributed system, such as over a "cloud" 1416 via a platform 1418 as described below.

Cloud 1416 includes and is representative of a platform 1418 for resources 1420. Platform 1418 abstracts underlying functionality of hardware (e.g., servers) and software resources of cloud 1416. Resources 1420 may include applications, data, or applications and data that can be utilized while computer processing is executed on servers that are remote from computing device 1402. Resources 1420 can also include services provided over the Internet, through a subscriber network, such as a cellular or Wi-Fi network, or combinations thereof. Resources 1420 can include asset store 1422, which stores assets, such as images, photographs (e.g., user images in a gallery, a database of stock photographs, and the like), document templates, user profile data, user image libraries, photographs posted in a shared photo service, animation sequences, videos, digital images, metadata of assets, and the like, and may be accessed by computing device 1402.

Platform 1418 may abstract resources and functions to connect computing device 1402 with other computing devices. Platform 1418 may also serve to abstract scaling of resources to provide a corresponding level of scale to encountered demand for resources 1420 that are implemented via platform 1418. Accordingly, in an interconnected device embodiment, implementation of functionality described herein may be distributed throughout system 1400. For example, the functionality may be implemented in part on computing device 1402 as well as via platform 1418 that abstracts the functionality of cloud 1416.

CONCLUSION

In one or more implementations, a digital medium environment includes at least one computing device. Systems, devices, and techniques are described herein for jointly editing related objects in a digital image, such as to warp an additional object that corresponds to a first object together with the first object, based on a single user-request to warp the first object. An image editing system segments a first object in a digital image, and an additional object corresponding to the first object, such a shadow cast by the first object, a reflection of the first object, an object of a same object class as the first object, and the like. The image editing system generates respective stick diagrams for the first object and the additional object that have been segmented, such as with a skeletization process. Based on the stick diagrams, the image editing system generates a mapping of the first object to the additional object. Based on a user request to edit the first object, such as to warp the first object, the image editing system jointly edits the first object and the additional object based on the mapping. Accordingly, the image editing system efficiently generates realistic digital images that maintain correspondence between related objects, without requiring a user to edit each object individually, thus saving time and resources.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

The invention claimed is:

1. An image editing system implemented by a computing device in a digital medium environment, the image editing system including modules implemented at least partially in hardware of the computing device, the image editing system comprising:
   a segmentation module to segment a first object appearing in a digital image and segment a second object appearing in the digital image, the first object having a visual correspondence with the second object;
   a skeletization module to generate skeletal diagrams of the first object and the second object, each skeletal diagram having nodes connected by line segments and end-points as skeletal paths of the skeletal diagrams;
   an object correspondence module to generate a mapping of the line segments and end-points of the first object skeletal diagram to the second object skeletal diagram based on the skeletal paths of the skeletal diagrams; and
   a deformation module to jointly edit the first object and the second object in the digital image responsive to receiving an edit input to edit the first object, the joint editing of the first object and the second object based on the mapping of the skeletal paths of the skeletal diagrams.

2. The image editing system as recited in claim 1, wherein the deformation module is configured to receive the edit input as a change in appearance of the first object in the digital image, and the joint editing includes similarly changing an appearance of the second object in the digital image.

3. The image editing system as recited in claim 1, wherein:
   the second object appearing in the digital image is a shadow of the first object; and
   the deformation module is configured to receive the edit input as a change in appearance of the first object in the digital image, and the joint editing includes changing an appearance of the shadow to maintain the visual correspondence that the first object has with the second object.

4. The image editing system as recited in claim 1, wherein:
   the second object appearing in the digital image is a reflection of the first object; and
   the deformation module is configured to receive the edit input as a change in appearance of the first object in the digital image, and the joint editing includes changing an appearance of the reflection to maintain the visual correspondence that the first object has with the second object.

5. The image editing system as recited in claim 1, further comprising a point correspondence module configured to:
   project anchor points for the first object as projected points onto the first object skeletal diagram; and
   determine, based on the mapping, corresponding points for the second object on the second object skeletal diagram that correspond to the projected points on the first object skeletal diagram.

6. The image editing system as recited in claim 5, further comprising a mesh module configured to:
   determine from the projected points on the first object skeletal diagram, a triangle mesh of first object triangles;
   determine from the corresponding points on the second object skeletal diagram, an additional triangle mesh of second object triangles; and
   wherein the deformation module is configured to jointly edit the first object and the second object together using a same transformation to both the first object triangles of the triangle mesh and the second object triangles of the additional triangle mesh.

7. The image editing system as recited in claim 1, wherein the skeletization module is configured to determine that the first object skeletal diagram matches the second object skeletal diagram by the skeletization module configured to:
   determine first coordinates of the nodes of the first object skeletal diagram in a normalized coordinate system for the first object skeletal diagram;
   determine second coordinates of the nodes of the second object skeletal diagram in a normalized coordinate system for the second object skeletal diagram;
   determine differences between the first coordinates and the second coordinates; and
   determine that a number of the differences less than a proximity threshold is greater than a threshold number of the nodes.

8. The image editing system as recited in claim 1, wherein the skeletization module is configured to determine that the first object skeletal diagram matches the second object skeletal diagram by the skeletization module configured to:
   determine first angles between the line segments of the first object skeletal diagram;
   determine second angles between the line segments of the second object skeletal diagram;
   determine differences between the first angles and the second angles; and
   determine that a number of the differences less than an angle difference threshold is greater than an angle number threshold.

9. The image editing system as recited in claim 1, wherein the skeletization module is configured to determine that the first object skeletal diagram matches the second object skeletal diagram by the skeletization module configured to:
   determine first lengths of the line segments of the first object skeletal diagram;
   determine second lengths of the line segments of the second object skeletal diagram;
   determine differences between the first lengths and the second lengths; and
   determine that a number of the differences less than a length difference threshold is greater than a length number threshold.

10. The image editing system as recited in claim 1, wherein the skeletal paths of the first object skeletal diagram that match the respective skeletal paths of the second object skeletal diagram are determined by the skeletization module configured to:
    determine differences between lengths of the line segments of the skeletal paths and lengths of the line segments of the respective skeletal paths are less than a distance threshold;
    determine differences between coordinates of the end-points of the skeletal paths and coordinates of the end-points of the respective skeletal paths are less than a position threshold; and
    determine that numbers of first symbols of first chain codes of the skeletal paths that equal second symbols of second chain codes of the respective skeletal paths are greater than a chain code threshold, the first chain codes and the second chain codes indicating directions of the skeletal paths and the respective skeletal paths, respectively.

11. In a digital medium environment for jointly editing related objects in at least one digital image, a method implemented by a computing device, the method comprising:
    segmenting a first object appearing in a digital image;
    segmenting a second object appearing in the digital image, the first object having a visual correspondence with the second object;
    generating skeletal diagrams of the first object and the second object, each skeletal diagram having nodes connected by line segments and end-points as skeletal paths of the skeletal diagrams;
    generating a mapping of the line segments and end-points of the first object skeletal diagram to the second object skeletal diagram based on the skeletal paths of the skeletal diagrams; and
    jointly editing the first object and the second object in the digital image responsive to receiving an edit input to edit the first object, the joint editing of the first object and the second object based on the mapping of the skeletal paths of the skeletal diagrams.

12. The method as recited in claim 11, further comprising receiving the edit input as a change in appearance of the first object in the digital image, and the joint editing includes similarly changing an appearance of the second object in the digital image.

13. The method as recited in claim 11, wherein:
    the second object appearing in the digital image is a shadow of the first object;
    the edit input is received as a change in appearance of the first object in the digital image; and
    the joint editing includes changing an appearance of the shadow to maintain the visual correspondence that the first object has with the second object.

14. The method as recited in claim 11, wherein:
    the second object appearing in the digital image is a reflection of the first object;
    the edit input is received as a change in appearance of the first object in the digital image; and
    the joint editing includes changing an appearance of the reflection to maintain the visual correspondence that the first object has with the second object.

15. The method as recited in claim 11, further comprising:
    projecting anchor points for the first object as projected points onto the first object skeletal diagram; and
    determining, based on the mapping, corresponding points for the second object on the second object skeletal diagram that correspond to the projected points on the first object skeletal diagram.

16. The method as recited in claim 15, further comprising:
    determining from the projected points on the first object skeletal diagram, a triangle mesh of first object triangles;
    determining from the corresponding points on the second object skeletal diagram, an additional triangle mesh of second object triangles; and
    jointly editing the first object and the second object together using a same transformation to both the first object triangles of the triangle mesh and the second object triangles of the additional triangle mesh.

17. The method as recited in claim 11, further comprising determining that the first object skeletal diagram matches the second object skeletal diagram by:
    determining first coordinates of the nodes of the first object skeletal diagram in a normalized coordinate system for the first object skeletal diagram;

determining second coordinates of the nodes of the second object skeletal diagram in a normalized coordinate system for the second object skeletal diagram;

determining differences between the first coordinates and the second coordinates; and determining that a number of the differences less than a proximity threshold is greater than a threshold number of the nodes.

18. The method as recited in claim 11, further comprising determining that the first object skeletal diagram matches the second object skeletal diagram by:

determining first angles between the line segments of the first object skeletal diagram;

determining second angles between the line segments of the second object skeletal diagram;

determining differences between the first angles and the second angles; and determining that a number of the differences less than an angle difference threshold is greater than an angle number threshold.

19. The method as recited in claim 11, further comprising determining that the first object skeletal diagram matches the second object skeletal diagram by:

determining first lengths of the line segments of the first object skeletal diagram;

determining second lengths of the line segments of the second object skeletal diagram;

determining differences between the first lengths and the second lengths; and determining that a number of the differences less than a length difference threshold is greater than a length number threshold.

20. The method as recited in claim 11, further comprising determining that the skeletal paths of the first object skeletal diagram match the respective skeletal paths of the second object skeletal diagram by:

determining differences between lengths of the line segments of the skeletal paths and lengths of the line segments of the respective skeletal paths are less than a distance threshold;

determining differences between coordinates of the end-points of the skeletal paths and coordinates of the end-points of the respective skeletal paths are less than a position threshold; and determining that numbers of first symbols of first chain codes of the skeletal paths that equal second symbols of second chain codes of the respective skeletal paths are greater than a chain code threshold, the first chain codes and the second chain codes indicating directions of the skeletal paths and the respective skeletal paths, respectively.

* * * * *